United States Patent
Wilson et al.

(10) Patent No.: US 12,544,083 B2
(45) Date of Patent: Feb. 10, 2026

(54) REUSABLE, CUSTOMIZABLE SHOULDER REPLACEMENT INSTRUMENTATION

(71) Applicant: Shoulder Innovations, Inc., Grand Rapids, MI (US)

(72) Inventors: Corey Wilson, Holland, MI (US); Robert J. Ball, West Olive, MI (US)

(73) Assignee: Shoulder Innovations, Inc., Grand Rapids, MI (US)

( * ) Notice: Subject to any disclaimer, the term of this patent is extended or adjusted under 35 U.S.C. 154(b) by 0 days.

(21) Appl. No.: 18/998,988

(22) PCT Filed: Jul. 28, 2023

(86) PCT No.: PCT/US2023/028996
§ 371 (c)(1),
(2) Date: Jan. 27, 2025

(87) PCT Pub. No.: WO2024/026101
PCT Pub. Date: Feb. 1, 2024

(65) Prior Publication Data
US 2025/0255624 A1    Aug. 14, 2025

Related U.S. Application Data

(60) Provisional application No. 63/369,678, filed on Jul. 28, 2022.

(51) Int. Cl.
*A61B 17/17*    (2006.01)
*A61B 17/16*    (2006.01)
(Continued)

(52) U.S. Cl.
CPC ...... *A61B 17/1778* (2016.11); *A61B 17/1684* (2013.01); *A61B 17/1697* (2013.01);
(Continued)

(58) Field of Classification Search
CPC . A61B 17/1778; A61B 17/8897; A61B 17/15; A61B 17/17; A61B 17/56;
(Continued)

(56) References Cited

U.S. PATENT DOCUMENTS

| | | | | |
|---|---|---|---|---|
| 6,063,091 A | * | 5/2000 | Lombardo | ......... A61B 17/1735 606/88 |
| 2002/0038126 A1 | * | 3/2002 | Dominguez | ....... A61B 17/0642 606/130 |

(Continued)

FOREIGN PATENT DOCUMENTS

| FR | 3104403 A1 | 6/2021 |
|---|---|---|
| WO | WO 2021/099472 A1 | 5/2021 |

OTHER PUBLICATIONS

International Search Report and Written Opinion dated Nov. 8, 2023 in Application No. PCT/US2023/028996, 18 pages.

*Primary Examiner* — Marcela I. Shirsat
(74) *Attorney, Agent, or Firm* — Knobbe, Martens, Olson & Bear, LLP

(57) ABSTRACT

Systems and methods for a customized reusable guide for shoulder replacements. In an example embodiment, a method comprises providing an alignment compass base, wherein the alignment compass base is configured to enable rotational orientation of a radial offset insert and a K-wire guide tube with respect to a guide base, inserting the guide base component into the alignment compass base, inserting the radial offset insert into the guide base component, rotating, using a first alignment tool, the radial offset insert to a first orientation angle with respect to the guide base component, inserting the K-wire guide tube into the radial offset insert, rotating, using a second alignment tool, the K-wire guide tube to a second orientation angle with respect to the guide base component.

30 Claims, 46 Drawing Sheets

(51) Int. Cl.
*A61B 17/56* (2006.01)
*A61B 17/88* (2006.01)
*A61B 34/10* (2016.01)
*A61B 90/00* (2016.01)
*A61F 2/40* (2006.01)
*A61F 2/46* (2006.01)

(52) U.S. Cl.
CPC ......... *A61B 17/56* (2013.01); *A61B 2017/564* (2013.01); *A61B 2017/568* (2013.01); *A61B 17/8897* (2013.01); *A61B 34/10* (2016.02); *A61B 2034/102* (2016.02); *A61B 2034/105* (2016.02); *A61B 2034/108* (2016.02); *A61B 2090/067* (2016.02); *A61F 2/4081* (2013.01); *A61F 2/4603* (2013.01); *A61F 2/4612* (2013.01); *A61F 2002/4633* (2013.01); *A61F 2/4657* (2013.01); *A61F 2002/4668* (2013.01); *A61F 2002/4677* (2013.01)

(58) Field of Classification Search
CPC ............ A61B 17/1684; A61B 17/1697; A61B 2017/568; A61B 2017/564; A61B 34/10; A61B 34/20; A61B 34/30; A61B 34/25; A61B 2034/105; A61B 2034/108; A61B 2034/102; A61B 2090/067; A61F 2/4657; A61F 2/40; A61F 2/4081; A61F 2/4603; A61F 2/4612; A61F 2002/4668; A61F 2002/4677; A61F 2002/4633
USPC .......................................................... 606/96
See application file for complete search history.

(56) References Cited

U.S. PATENT DOCUMENTS

2005/0075638 A1 4/2005 Collazo
2009/0270866 A1 10/2009 Poncet

* cited by examiner

REUSABLE, CUSTOMIZABLE SHOULDER REPLACEMENT INSTRUMENTATION

PRIORITY

This application is a U.S. National Phase of International Application No. PCT/US2023/028996, filed Jul. 28, 2023, which claims the benefit of U.S. Provisional No. 63/369,678, filed Jul. 8, 2022, the contents of which are hereby expressly incorporated by reference in their entirety. Any and all applications for which a foreign or domestic priority claim is identified in the Application Data Sheet as filed with the present application are hereby incorporated by reference under 37 CFR 1.57.

BACKGROUND

Shoulder replacement is a commonly performed medical procedure for various conditions. During treatment, a reamer is typically used to prepare the surface of a glenoid to receive a shoulder implant. Prior to reaming, a guide pin or wire, sometimes referred to as a "K-wire" is initially inserted into the glenoid. The K-wire is positioned at a predetermined position and angular orientation in order to assure that the glenoid surface is properly prepared. The reamer is advanced over the K-wire such that the reamer prepares the glenoid surface at the proper location and angular orientation. The proper position and angular orientation of the K-wire may be determined in advance by using surgical planning software. The surgical planning software may enable customized manufacturing of a surgical guide that is positioned against the glenoid to assist in accurate K-wire placement. However, it may take hours or days to fabricate the customized surgical guide, which must be separately sterilized and stored prior to surgery. This precludes the ability to make any last-minute adjustments to the guide. In addition, such customized components are discarded after use, as they cannot be modified once manufactured (e.g., from a 3D printer). This leads to additional cost to the clinician and patient.

What is needed is a customizable guide for prosthesis positioning and orientation, whereby a medical provider may assemble a patient-customized guide for K-wire placement and orientation and may make quick adjustments to sizing if needed immediately before or during surgery.

SUMMARY

Various embodiments described herein relate to systems, devices, and methods for enabling rotation of a radial offset insert and a K-wire guide tube with respect to a guide base. In some embodiments, a method comprising: providing an alignment compass base, wherein the alignment compass base is configured to enable rotational orientation of a radial offset insert and a K-wire guide tube with respect to a guide base; inserting the guide base component into the alignment compass base; inserting the radial offset insert into the guide base component; rotating, using a first alignment tool, the radial offset insert to a first orientation angle with respect to the guide base component; inserting the K-wire guide tube into the radial offset insert; rotating, using a second alignment tool, the K-wire guide tube to a second orientation angle with respect to the guide base component.

In some embodiments, the guide base component includes an opening configured to receive a key; and wherein inserting the radial offset insert into the guide base component comprises expanding the opening by rotating the key.

In some embodiments, rotating the radial offset insert to the first orientation angle further comprises contracting the opening by rotating the key in the opening.

In some embodiments, the radial offset insert includes an opening configured to receive a key; and wherein inserting the K-wire guide tube into the radial offset insert comprises expanding the opening by rotating the key in the opening.

In some embodiments, rotating the radial offset insert to the first orientation angle further comprises contracting the opening by rotating the key in the opening.

In some embodiments, wherein the first alignment tool is a disc or a plate.

In some embodiments, the first alignment tool includes an opening shaped to receive a perimeter of a portion of the radial offset insert and wherein the first alignment tool is configured to contact with a side of the radial offset insert when rotated. In some embodiments, the second alignment tool is a disc or a plate.

In some embodiments, the second alignment tool includes an opening shaped to receive a perimeter portion of the K-wire guide tube and wherein the second alignment tool is configured to contact with a side of the radial offset insert when rotated.

In some embodiments, further comprising rotating the first alignment tool and the second alignment tool with respect to the alignment compass base.

In some embodiments, a customizable shoulder replacement instrumentation device, comprising: an alignment compass base, wherein the alignment compass base is configured to enable rotational orientation of a radial offset insert and a K-wire guide tube with respect to a guide base; the guide base component configured to be inserted into the alignment compass base; the radial offset insert configured to be inserted into the guide base component, wherein the radial offset insert may be rotated to a first orientation angle with respect to the guide base component using a first alignment tool; the K-wire guide tube configured to be inserted into the radial offset insert, wherein the K-wire guide tube may be rotated to a second orientation angle with respect to the guide base component using a second alignment tool.

In some embodiments, the guide base component includes an opening configured to receive a key; and wherein the radial offset insert may fit into the guide base component by expanding the opening by rotating the key.

In some embodiments, the radial offset insert may fit into the guide base component by contracting the opening by rotating the key in the opening.

In some embodiments, the radial offset insert includes an opening configured to receive a key; and wherein inserting the K-wire guide tube into the radial offset insert comprises expanding the opening by rotating the key in the opening.

In some embodiments, rotating the radial offset insert to the first orientation angle further comprises contracting the opening by rotating the key in the opening.

In some embodiments, the first alignment tool is a disc or a plate.

In some embodiments, the first alignment tool includes an opening shaped to receive a perimeter of a portion of the radial offset insert and wherein the first alignment tool is configured to contact with a side of the radial offset insert when rotated.

In some embodiments, the second alignment tool is a disc or a plate.

In some embodiments, the second alignment tool includes an opening shaped to receive a perimeter portion of the K-wire guide tube and wherein the second alignment tool is configured to contact with a side of the radial offset insert when rotated.

In some embodiments, the first alignment tool and the second alignment tool are rotated with respect to the alignment compass base.

In some embodiments, a customizable shoulder replacement instrumentation kit, comprising:
an alignment compass base, wherein the alignment compass base is configured to enable rotational orientation of a radial offset insert and a K-wire guide tube with respect to a guide base; the guide base component of a plurality of guide base components configured to be inserted into the alignment compass base, wherein the plurality of guide base components comprises guide base components of different sizes;
the radial offset insert of a plurality of radial offset inserts configured to fit into the guide base component, wherein the plurality of radial offset inserts comprises radial offset inserts of different sizes; wherein the radial offset insert may be rotated to a first orientation angle with respect to the guide base component using a first alignment tool; the K-wire guide tube of a plurality of K-wire guide tubes configured to fit into the radial offset insert, wherein the plurality of K-wire guide tubes comprises K-wire guide tubes of different sizes; wherein the plurality of K-wire guide tubes may be rotated to a second orientation angle with respect to the guide base component using a second alignment tool.

In some embodiments, the guide base component includes an opening configured to receive a key; and wherein inserting the radial offset insert into the guide base component comprises expanding the opening by rotating the key.

In some embodiments, the radial offset insert may be inserted into the guide base component by contracting the opening by rotating the key in the opening.

In some embodiments, the radial offset insert includes an opening configured to receive a key; and wherein inserting the K-wire guide tube into the radial offset insert comprises expanding the opening by rotating the key in the opening.

In some embodiments, rotating the radial offset insert to the first orientation angle further comprises contracting the opening by rotating the key in the opening.

In some embodiments, the first alignment tool is a disc or a plate.

In some embodiments, the first alignment tool includes an opening shaped to receive a perimeter of a portion of the radial offset insert and wherein the first alignment tool is configured to contact with a side of the radial offset insert when rotated.

In some embodiments, the second alignment tool is a disc or a plate.

In some embodiments, the second alignment tool includes an opening shaped to receive a perimeter portion of the K-wire guide tube and wherein the second alignment tool is configured to contact with a side of the radial offset insert when rotated.

In some embodiments, the first and second alignment tools are rotated with respect to the alignment compass base.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
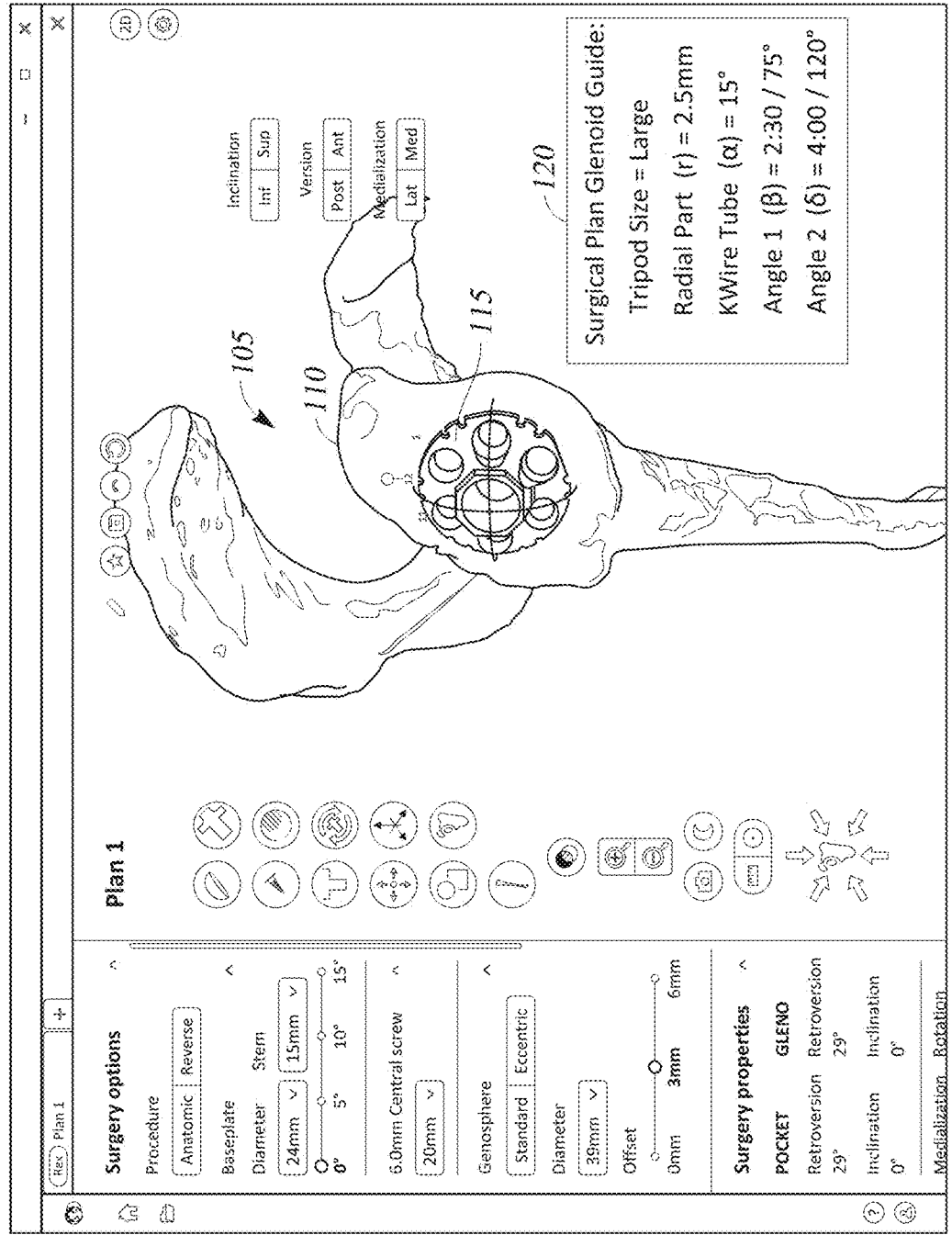
FIG. 1 illustrates one embodiment of an interface of a shoulder implant surgical planning software system.

One embodiment of a user interface of a shoulder implant surgical planning system 100 is illustrated in FIG. 1. The shoulder implant planning system 100 is configured to receive images of a patient's glenoid, generate a three-dimensional virtual model 105 of the glenoid 110, and allow a clinician to select a suitable shoulder implant 115 and simulate the positioning, orientation, and implantation of the shoulder implant system 115 in the virtual model 105 of the glenoid 110. The image may include multiple slices or images from a computed tomography (CT) scan, x-rays, or other imaging system.

During a surgical planning and simulation stage, the clinician selects the desired implant 115 and places it at a desired location in the virtual model 105 of the glenoid 110. The shoulder implant planning system 100 then determines appropriate implantation instrumentation and instrumentation orientation components and parameters 120 to be used by the clinician during the actual surgery to achieve the simulated implant implantation performed using the shoulder implant planning system 100.

For example, the shoulder implant planning system 100 determines the location of the implant pin (or center post or peg) center in two dimensions (e.g., inferior-superior direction and the anterior-posterior direction). The system also determines the angular orientation of the implant pin with respect to the glenoid face. This is also determined in two dimensions (e.g., version and inclination). The calculated pin center location and angular orientation are used to identify and select appropriate instrumentation components, and to determine the orientation of each instrumentation component with respect to each other during use.

In the illustrated embodiment of FIG. 1, the shoulder implant planning system 100 has determined that large sizes tripod component (sometimes referred to as a base component or a guide base component) and a radial offset component (sometimes referred to as a radial offset bushing or a radial offset insert) having a 2.5 mm offset, and a K-wire guide tube (sometimes referred to as a K-wire guide tube insert) having an angle of 15 degrees should be used. The shoulder implant planning system 100 has also determined that radial component should be oriented at 75 degrees with respect to the tripod component, and that the K-wire guide tube should be oriented at an angle of 120 degrees with respect to the tripod component. The identification of these components, and the orientation angles will be used by the user to quickly assembly K-wire guide instrumentation, as will be discussed in greater detail, below.

Figure 2:
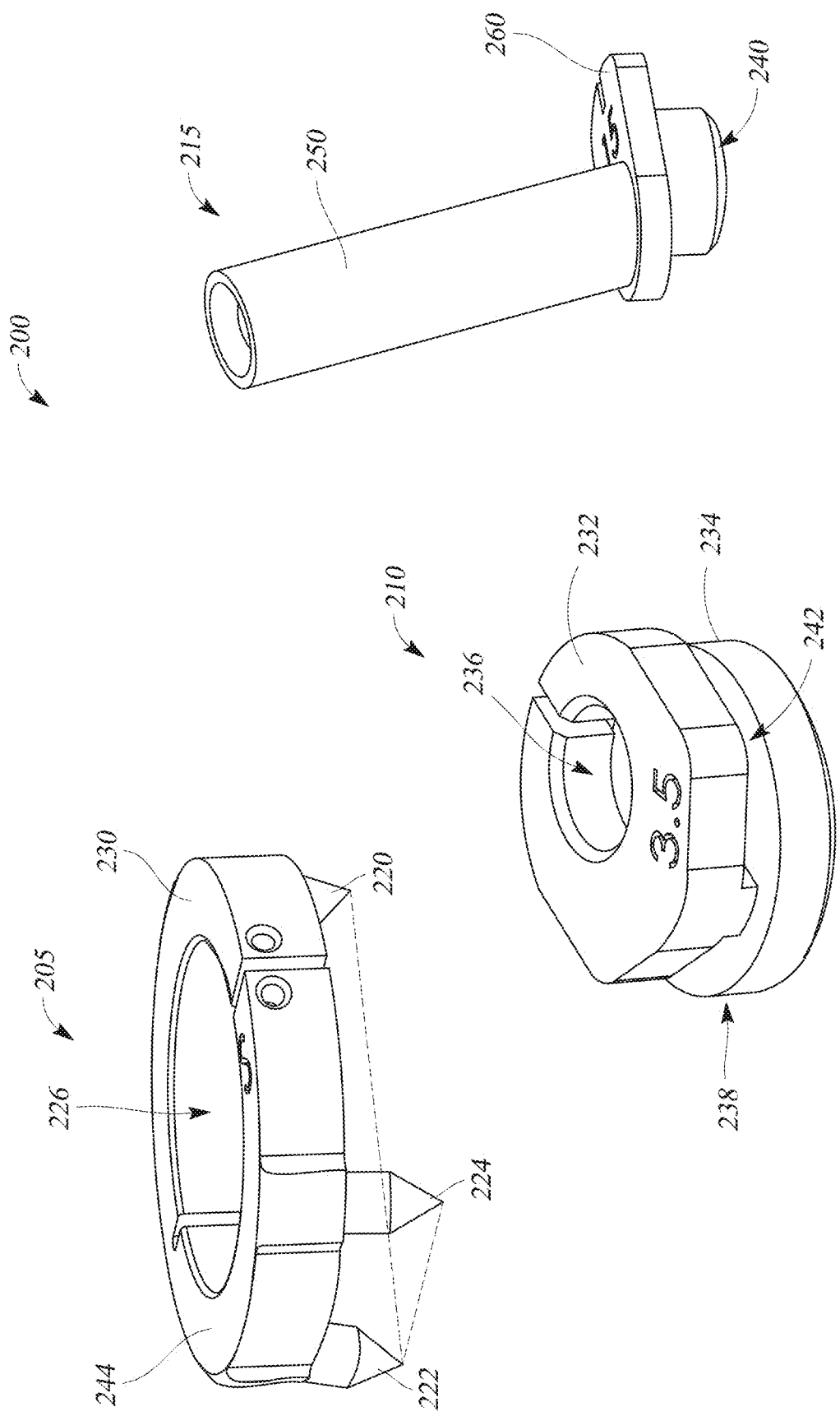
FIG. 2 illustrates one embodiment of a set or kit of instrumentation components that are configured to be used with the shoulder implant surgical planning software system of FIG. 1.

FIG. 2 illustrates one embodiment of a set or kit of instrumentation components 200 that are configured to be used with the shoulder implant planning system 100 of FIG. 1. In some embodiments, instrumentation components 200 include a guide base component 205, a radial offset insert 210, and a K-wire guide tube insert 215. The guide base component 205 may be provided in the form of a tripod, having three pointed feet 220, 222, 224 for placement on a patient's glenoid, and for establishing a reference plane with respect to the glenoid surface. The guide base component 205 may be available in different sizes (e.g., small, medium, large, extra-large) and will generally be selected by the shoulder implant planning system based on the size of the patient's glenoid fossa.

Figure 3:
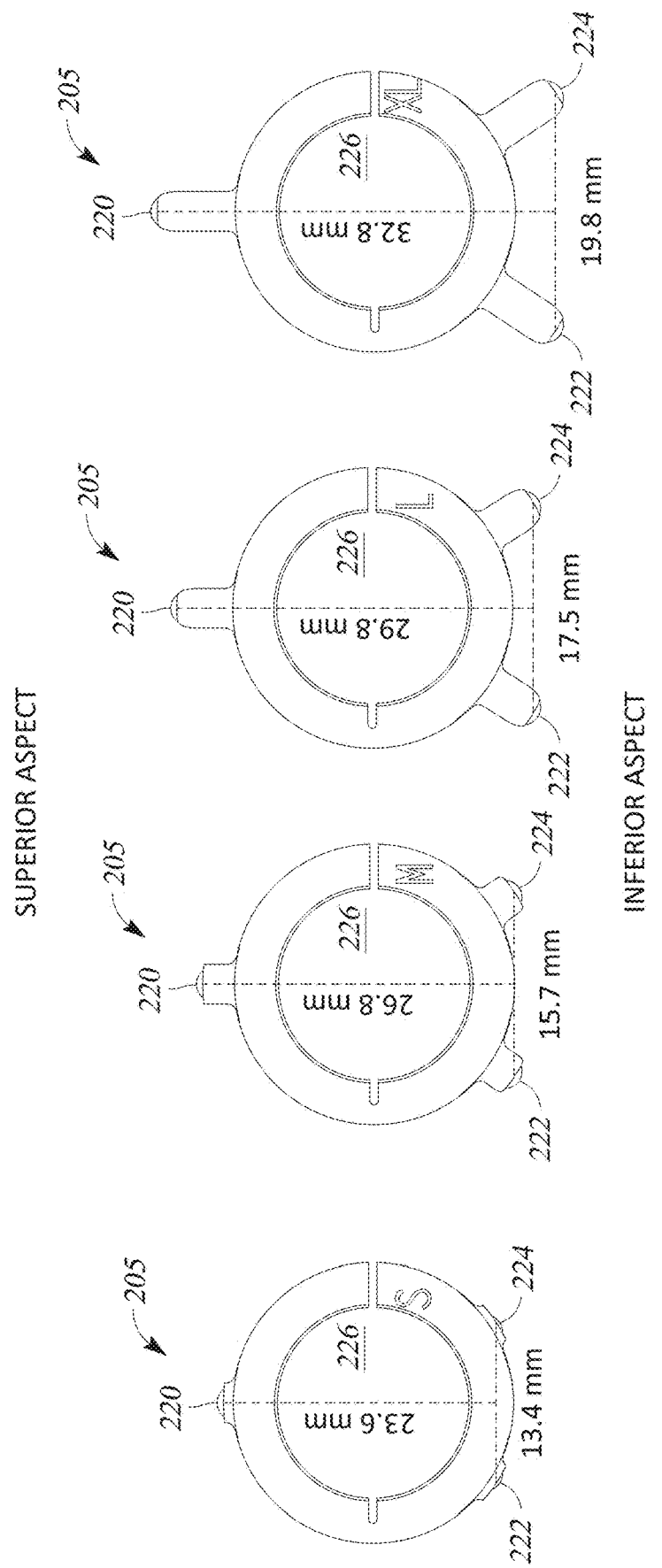
FIG. 3 illustrates different sized guide base components according to one embodiment of the system.

FIG. 3 illustrates different sized guide base components 205. In some embodiments, the guide base component 205 may include one pin-like foot 220 positioned at the superior aspect of the guide base component 205, and two pin-like feet 222, 224 positioned at the inferior aspect of the guide base component 205. In some embodiments, the guide base component 205 may have a generally annular or circular shape and it may include a circular opening 226 extending through its thickness and along its central axis. In some embodiments, the two inferior feet 222, 224 may be spaced apart based upon the guide base component size. In one embodiment, and as shown in FIG. 3, the small base's inferior feet 222, 224 are separated by 13.4 mm, the medium base's inferior feet 222, 224 are separated by 15.7 mm, the large base's 205 inferior feet 222, 224 are separated by 17.5 mm, and the extra-large base's feet 222, 224 are separated by 19.8 mm. The distance from the base's 205 superior foot 110 to an imaginary line extending between the glenoid-contacting tips of its two inferior feet 222, 224 can vary based upon the guide base component size, as well. In one embodiment, as shown in FIG. 3, this distance is 23.6 mm, 26.8 mm, 29.8 mm, or 32.8 mm for the small, medium, large, and extra-large guide base components, respectively. The guide base component may also include a locking mechanism (not shown), such as screw and slotted wall that brings two portions of the guide base component 205 closer to each other, causes the circular opening 226 to contract and squeeze down on the radial offset insert 210 and the K-wire guide tube insert 215 (not shown in FIG. 3) when inserted into the opening 226, thereby locking them in position and preventing them from further movement.

Figure 4:
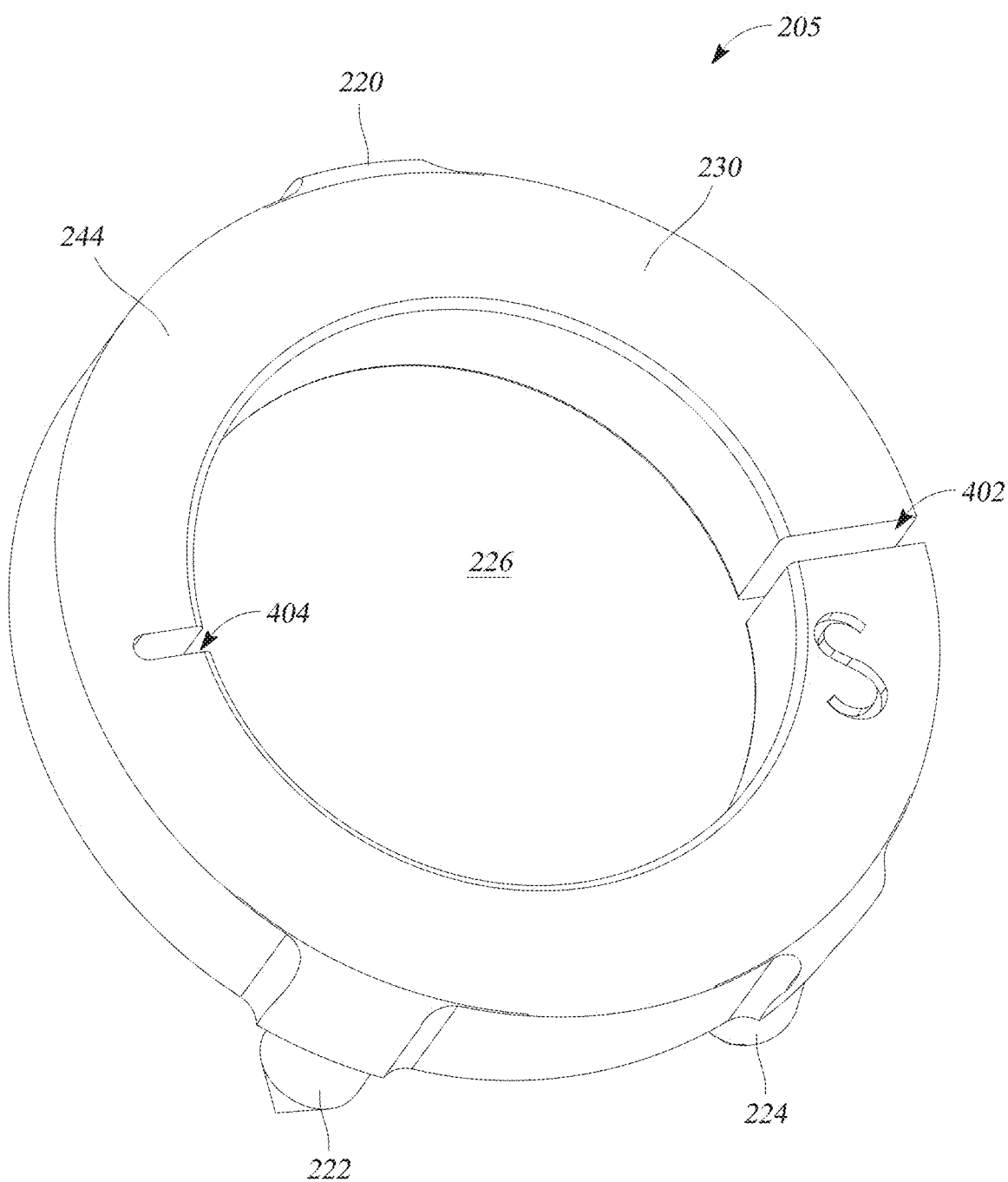
FIGS. 4-10 illustrates additional views of one of the guide base components of FIG. 3.

FIGS. 4-10 illustrate additional embodiments of the guide base component 205. For example, FIG. 4 illustrates a guide base component 205 with a key-activated locking mechanism. As shown in in FIG. 4, guide base component 205 may contain a support 230 having a circular opening 226, and pointed feet 220, 222, 224. The key-activated locking mechanism may be implemented as a base slot 402 and base notch 404, or in some cases, just a base slot 402.

Figure 11:
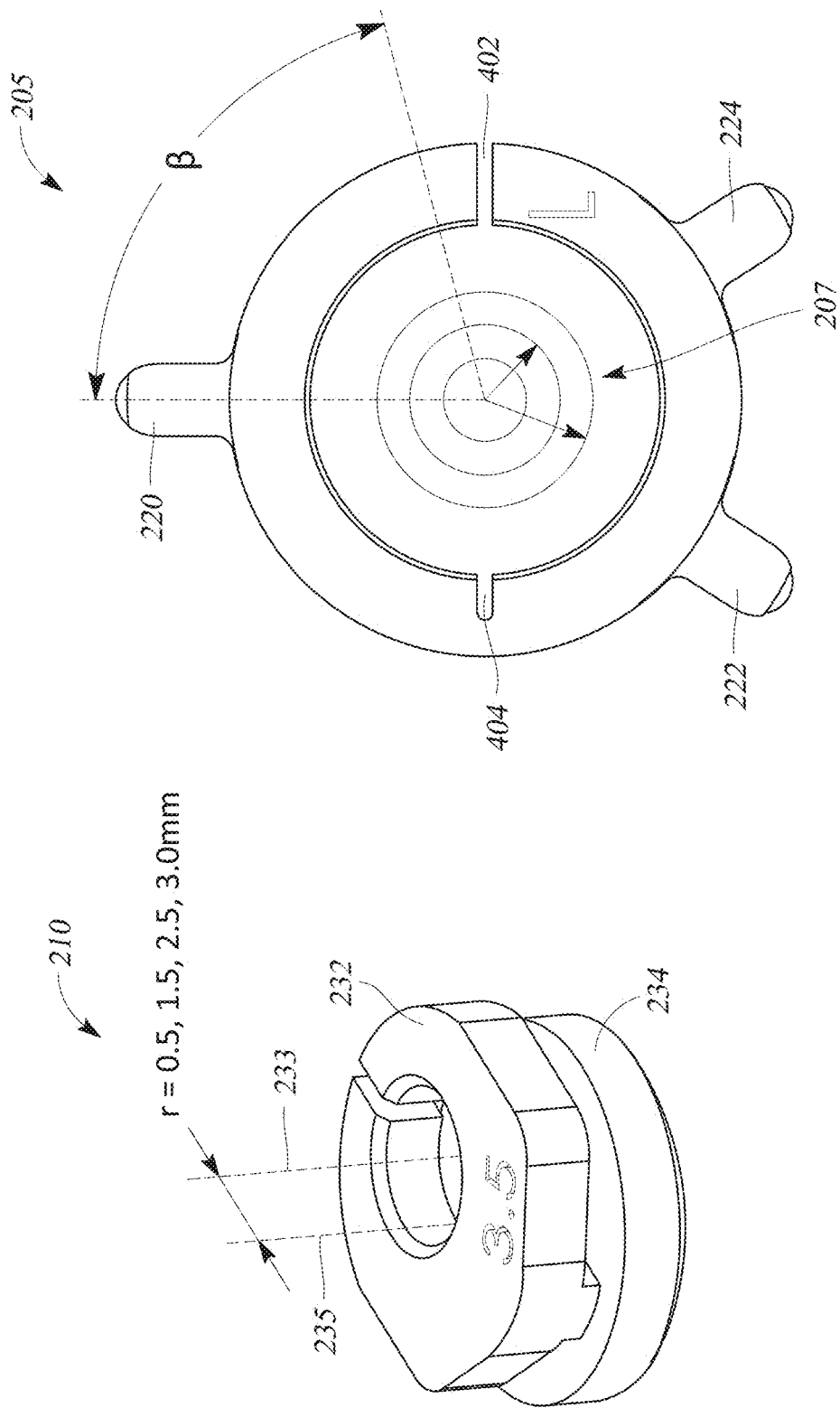
FIG. 11 illustrates the radial offset insert of FIG. 2 inserted into and rotationally oriented with respect to the guide base component of FIG. 2.

In some embodiments, a key (not shown) may be used to cause the circular opening 226 to expand in diameter such that it may receive a radial offset insert (e.g., the radial offset insert 210 of FIG. 11). In some embodiments, the key has a rectangular cross-sectional shape at its end, such that its narrow dimension is small enough to fit inside the slot 402, and its wider dimension is large enough to push the walls of the slot 402 apart from one another to expand the opening 226 diameter. The notch 404 provides additional flexibility to the support 230 and helps facilitate expansion of the opening 226 diameter. The key may be inserted into the slot 402 and rotated such that the circular opening 226 is expanded to allow placement radial offset insert 210 ("open configuration"). In some embodiments, after placement of radial offset insert 210, the key may be removed from base slot 402, causing the circular opening 226 to contract and squeeze down on the radial offset insert 210 after it has been inserted into the opening 226, thereby locking the radial offset insert 210 in position and preventing it from further rotation with respect to the base 205.

Figure 5:
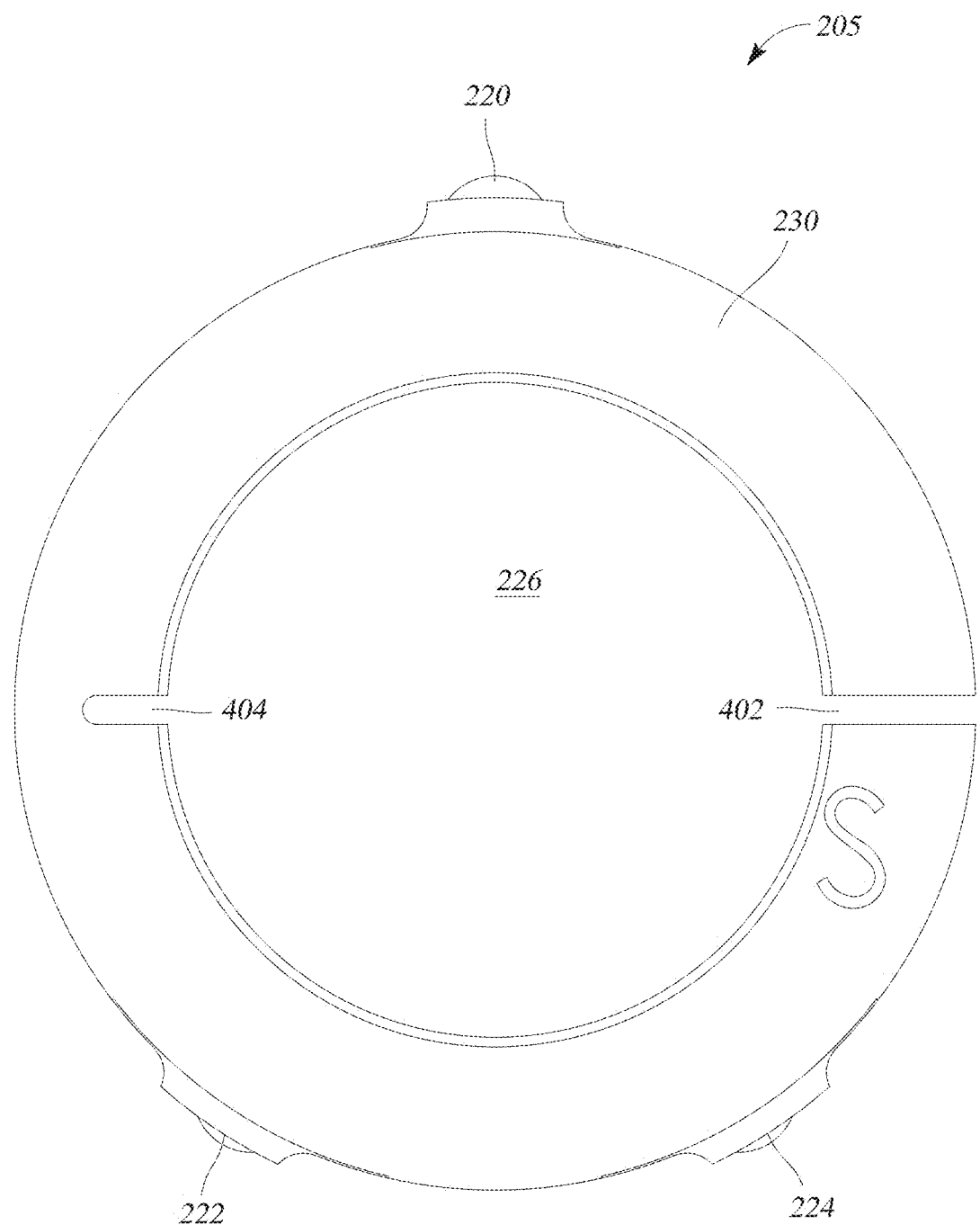
Figure 6:
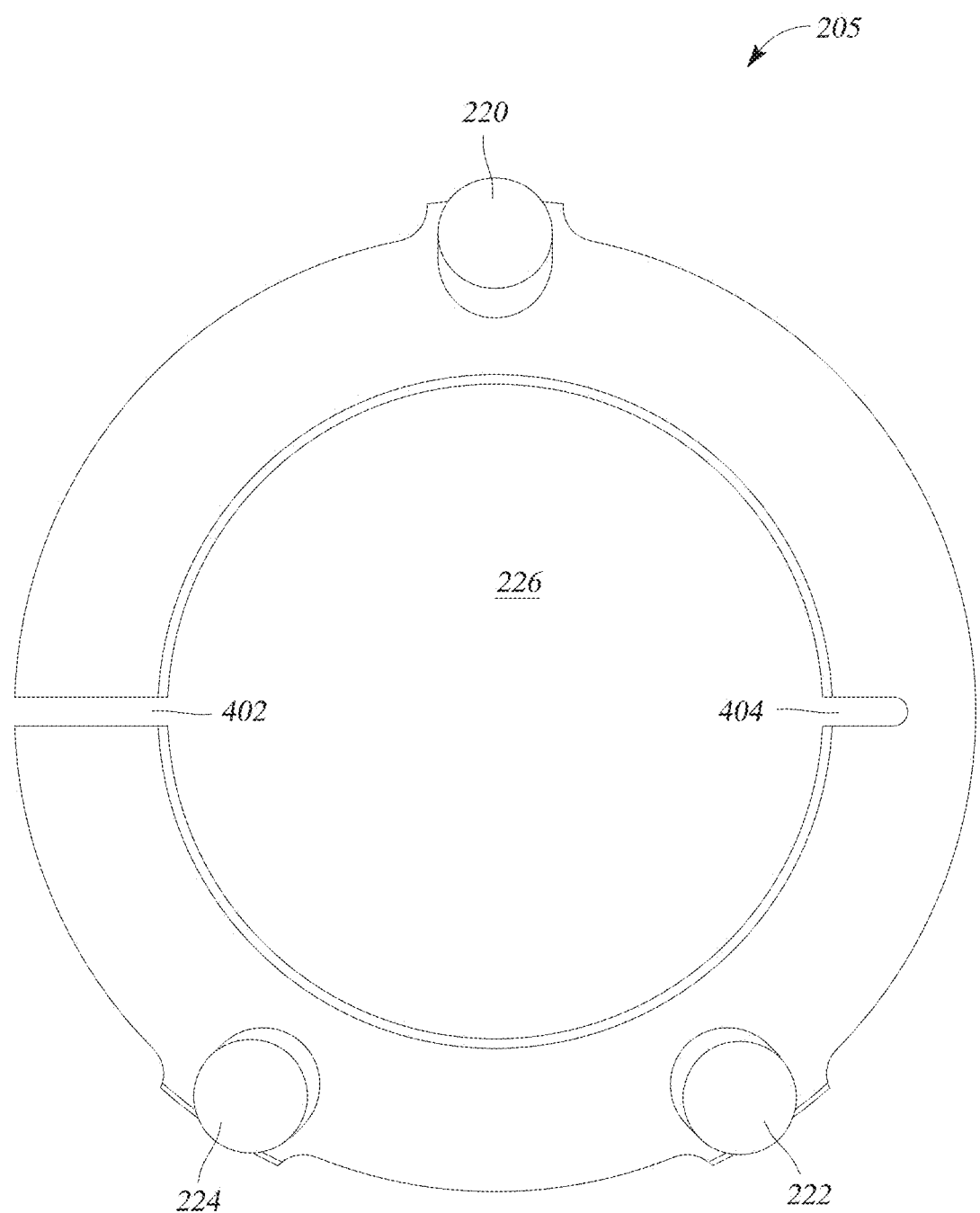
Figures 7, 8:
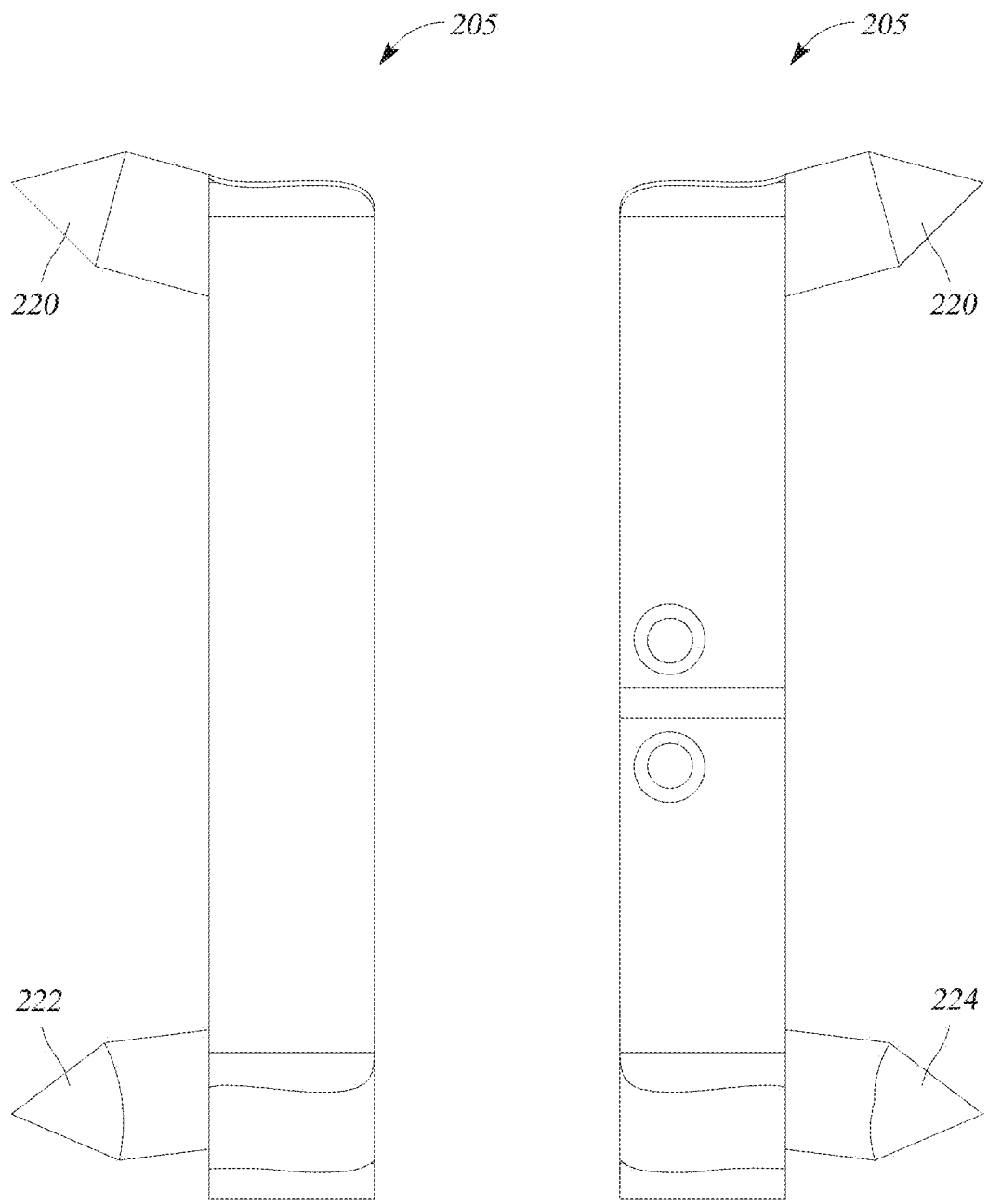
Figure 9:
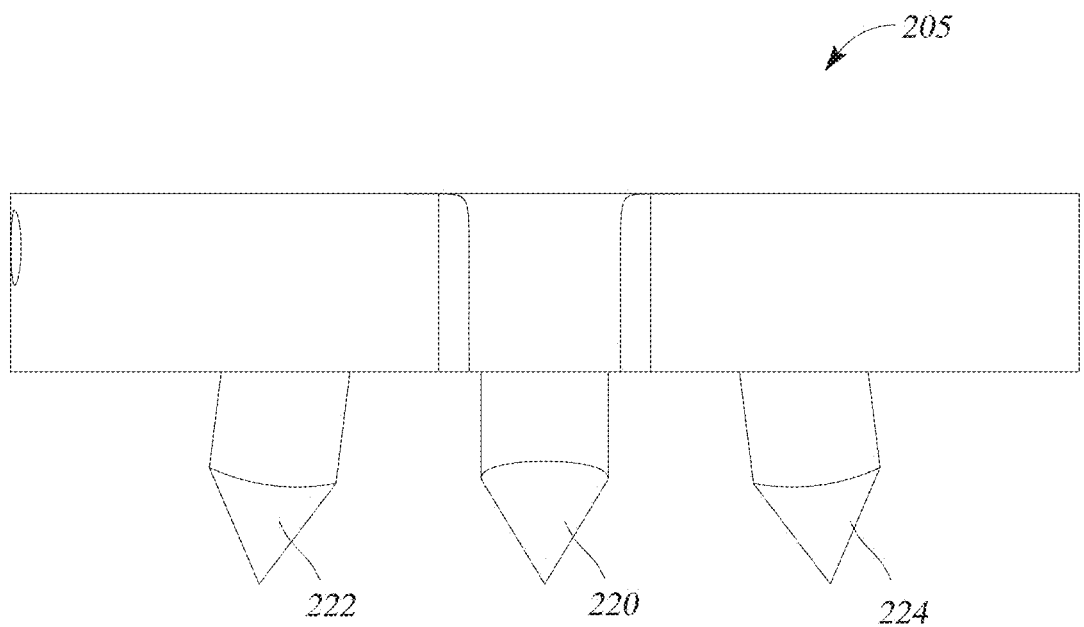
Figure 10:
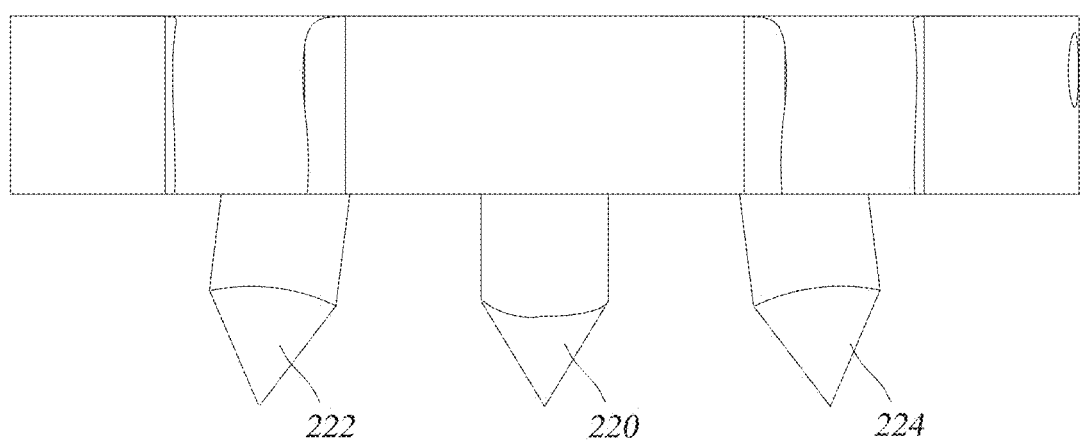

FIGS. 5-10 illustrate additional views of the guide base component 205 having the key locking mechanism described above with respect to FIG. 4. FIG. 5 illustrates a top-down view or bird's eye view of guide base component 205. FIG. 6 illustrates a bottom-up view of guide base component 205. FIGS. 7 and 8 illustrate a side view of guide base component 205. FIGS. 9 and 10 illustrate additional side views of guide base component 205.

Referring again to FIG. 2, the radial offset insert 210 is configured to be positioned and rotated to a desired orientation within the circular opening 226 of the guide base component 205. The radial offset insert 210 includes an offset plate 232 and a circular guide portion 234. The circular guide portion 234 includes a cylindrical cavity 236 configured to receive a corresponding portion 240 of the K-wire guide tube insert 215. The circular guide portion 234 has a circular outer dimension 238 configured to be positioned within the circular opening 226 of the guide base component 205. The central longitudinal axis of the cylindrical cavity 236 is offset a predetermined distance from the central longitudinal axis of the circular guide portion 234. This offset distance value may be engraved within or otherwise indicated on the radial offset insert's offset plate 232. In certain embodiments, the radial offset insert 210 has an offset dimension value (r) of 0.5, 1.0, 1.5, 2.0, 2.5, 3.0, 3.5, 4.0, or 5.0 mm.

FIGS. 11-18 illustrate additional views of the radial offset insert 210 of FIG. 2. FIG. 11 shows the radial offset insert 210 and the offset (r) between the central longitudinal axis 233 of the offset plate 232 and the central longitudinal axis 235 of the circular guide portion 234. The offset r may be 0.5, 1.5, 2.5, 3.0 mm, or within a range bound by any of these two values. FIG. 11 also illustrates a base 205 and an orientation angle (beta) between the base 205 and the radial offset insert 210. The rings 207 shown within the base 205 correspond to the possible locations of the center of a radial offset insert 210 offset plate 232 when inserted into the base 205. For example, the innermost ring corresponds to possible locations of the center of a radial offset insert 210 offset plate 232 having an offset r value of 0.5 mm. The next ring, moving outward, corresponds to possible locations of the center of a radial offset insert 210 offset plate 232 having an offset r value of 1.5 mm. The outermost ring corresponds to possible locations of the center of a radial offset insert 210 offset plate 232 having an offset r value of 2.5 mm.

Figure 12:
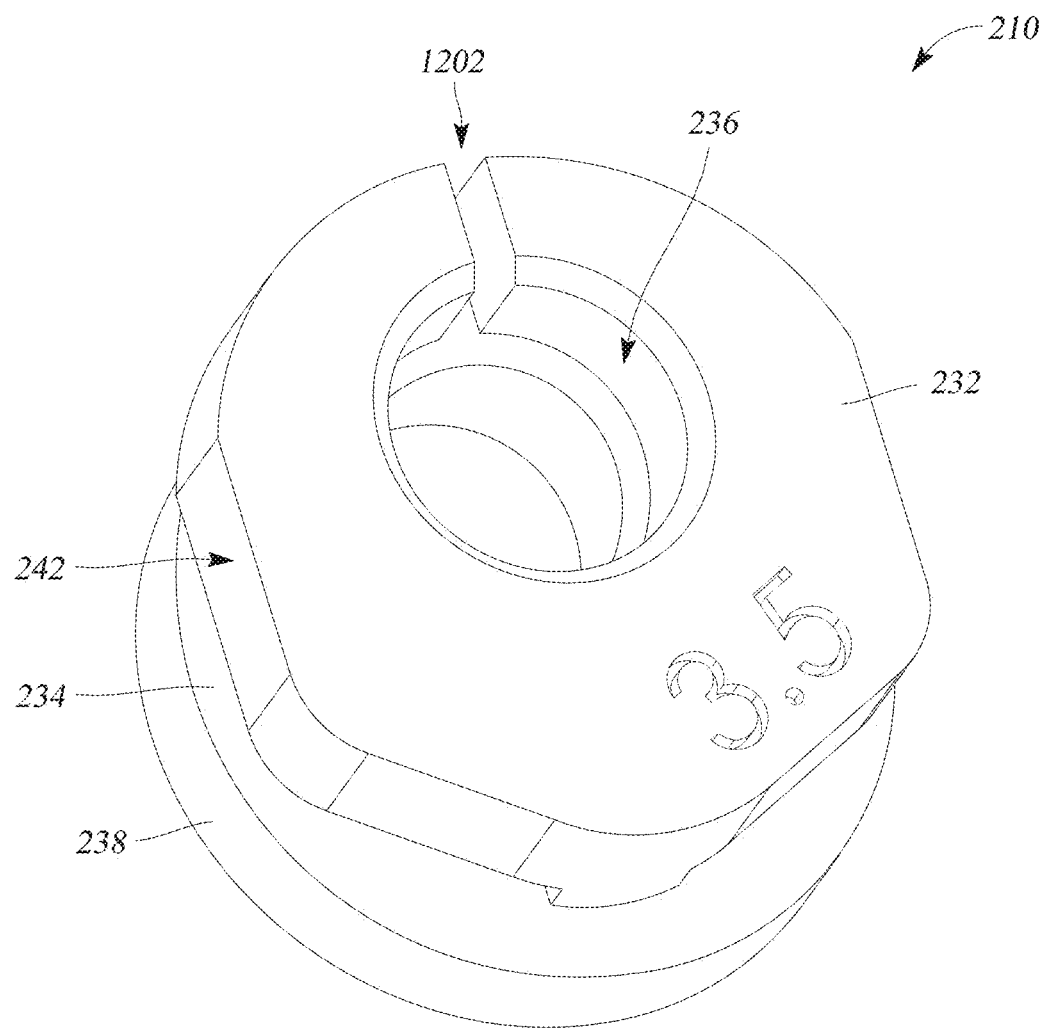
FIGS. 12-18 illustrates the radial offset insert with a key locking mechanism.

FIG. 12 illustrates a radial offset insert 210 with a locking mechanism similar to the locking mechanism of the base component 205 of FIG. 4. The radial offset insert 210 of FIG. 12 may be utilized with the guide base component 205 of FIG. 4. Similar to the description of base slot 402 and a key with respect to FIG. 4, the radial offset insert 210 may utilize a similar locking mechanism to secure the radial offset insert 210 to a K-wire guide tube insert 215 (not shown). For example, radial offset insert 210 may include a radial offset slot 1202 and an optional radial offset notch (not shown, but which may optionally be positioned opposite the radial offset slot 1202). In some embodiments, a key may be inserted into the slot 1202 and rotated such that the cylindrical cavity 236 is expanded to allow placement of a K-wire guide tube insert 215 ("open configuration"). In some embodiments, after placement of the K-wire guide tube insert 215, the key may be rotated to a closed position to allow the walls of the slot 1202 to move closer to each other. The key is then removed from radial offset slot 1202, causing the cylindrical cavity 236 to contract and squeeze down on the K-wire guide tube insert 215 when inserted into the cylindrical cavity 236. The tightening of the cylindrical cavity 236 around the K-wire guide tube insert 215 locks them in position with respect to each other and prevents them from further movement or rotation with respect to each other. In some embodiments, the same key may be used to open and close the base slot 402 of the base 205 and the radial offset slot 1202 of the radial offset insert 210.

Figure 13:
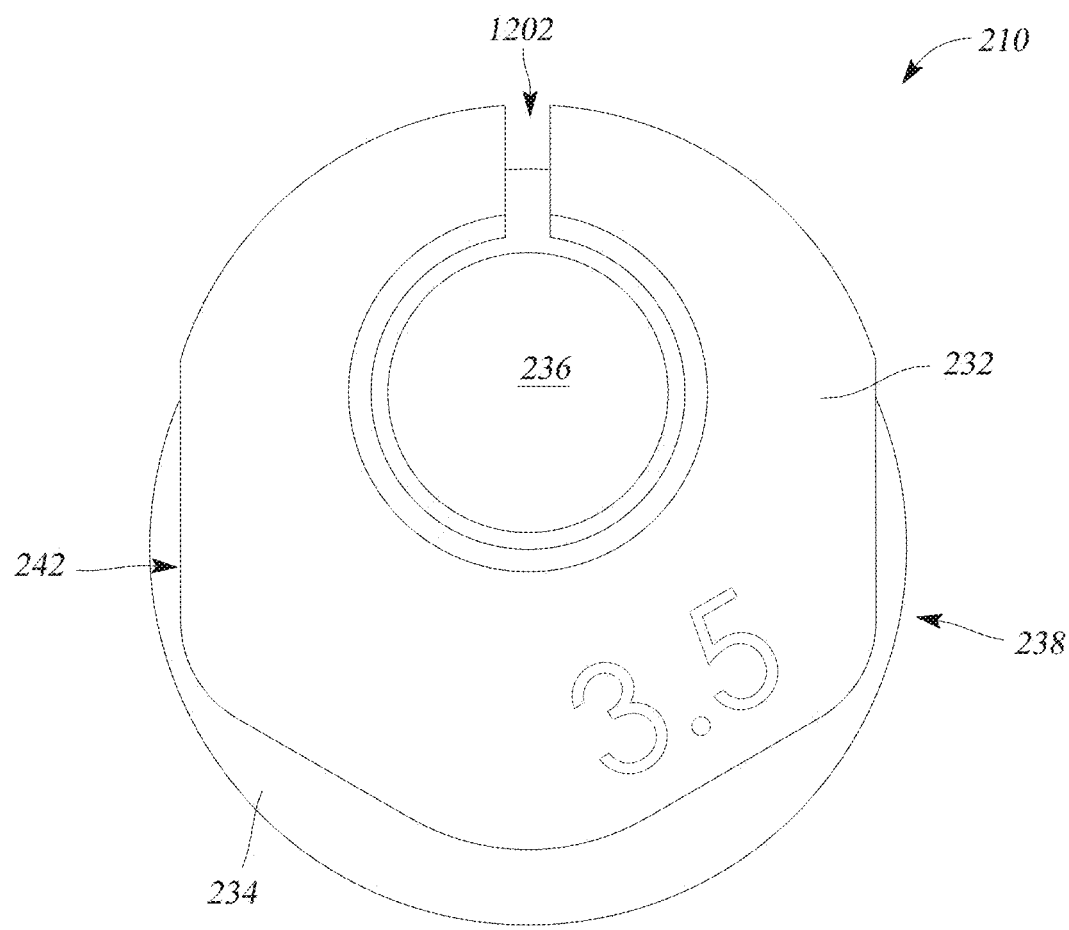
Figure 14:
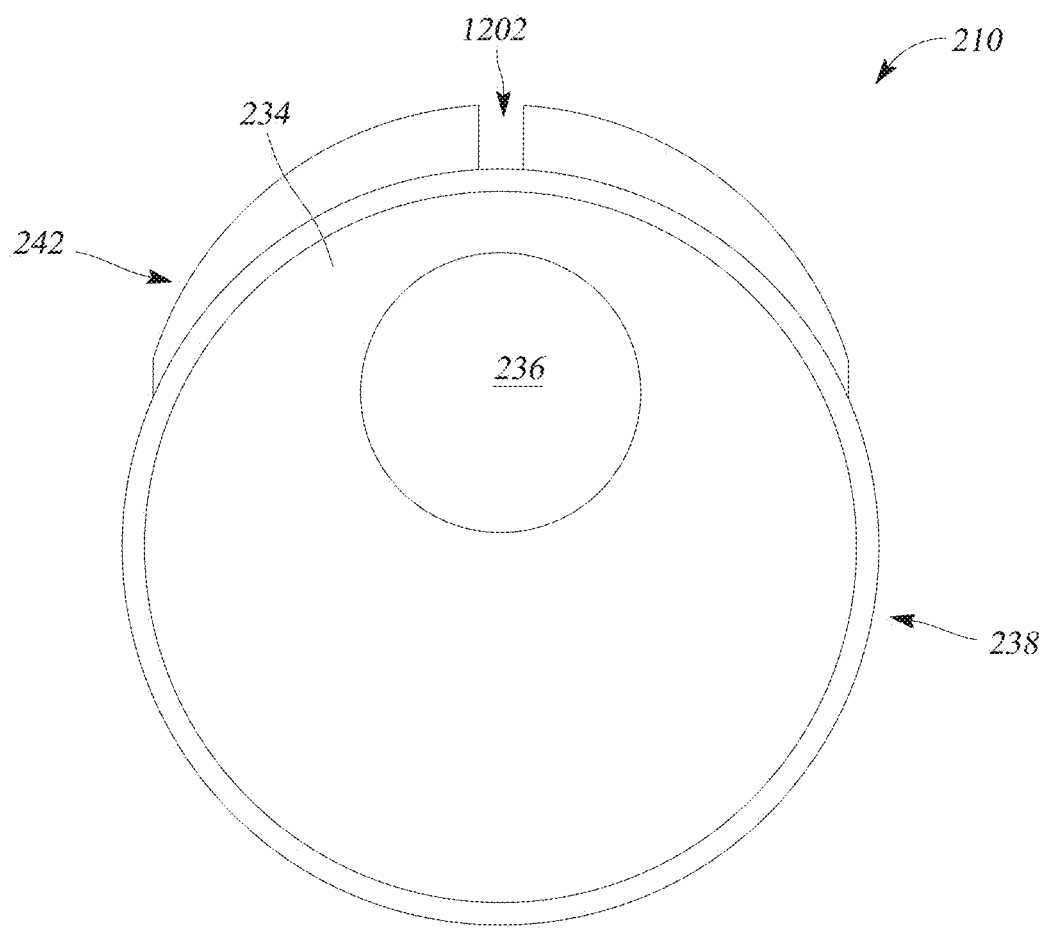
Figures 15, 16:
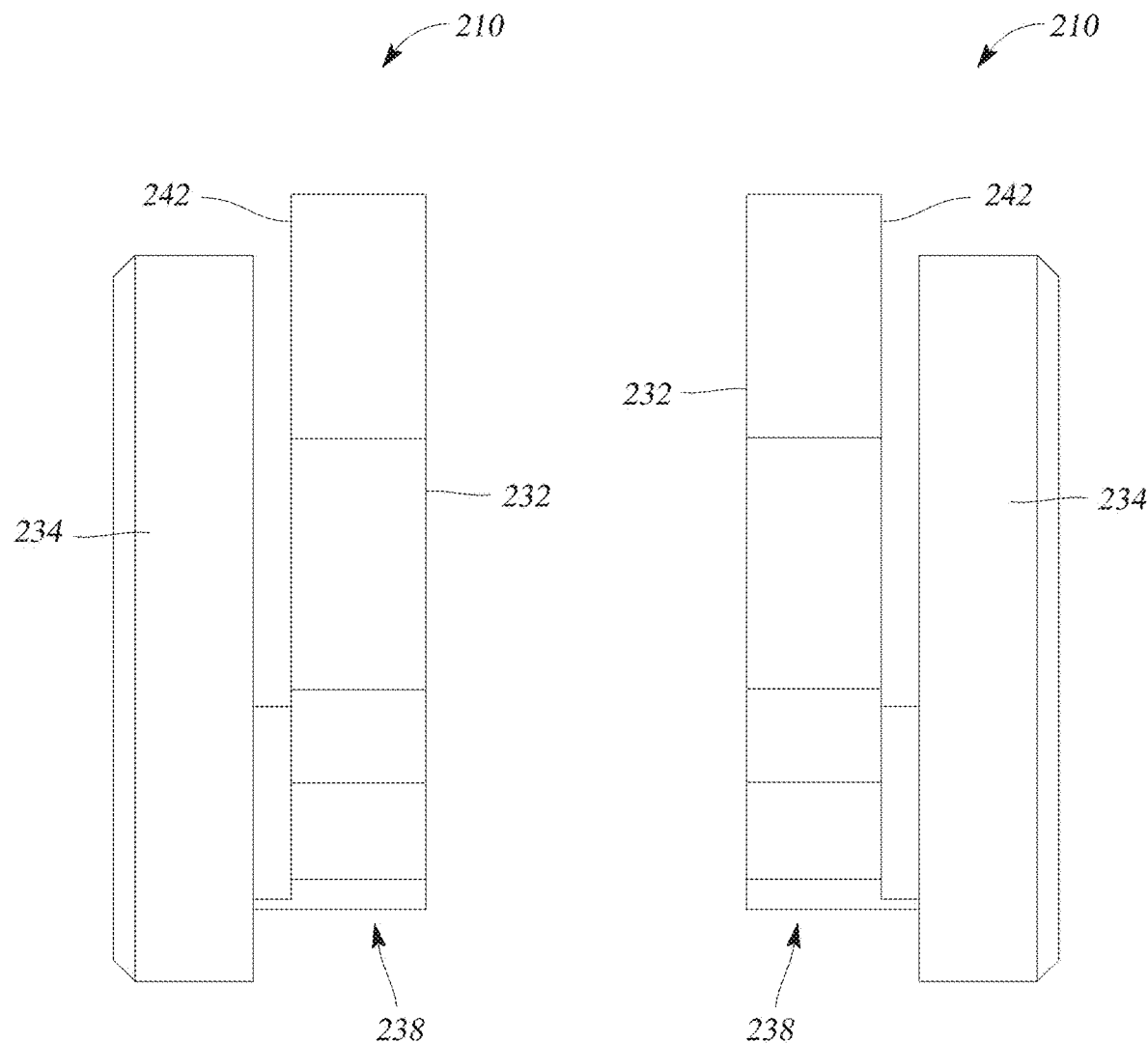
Figure 17:
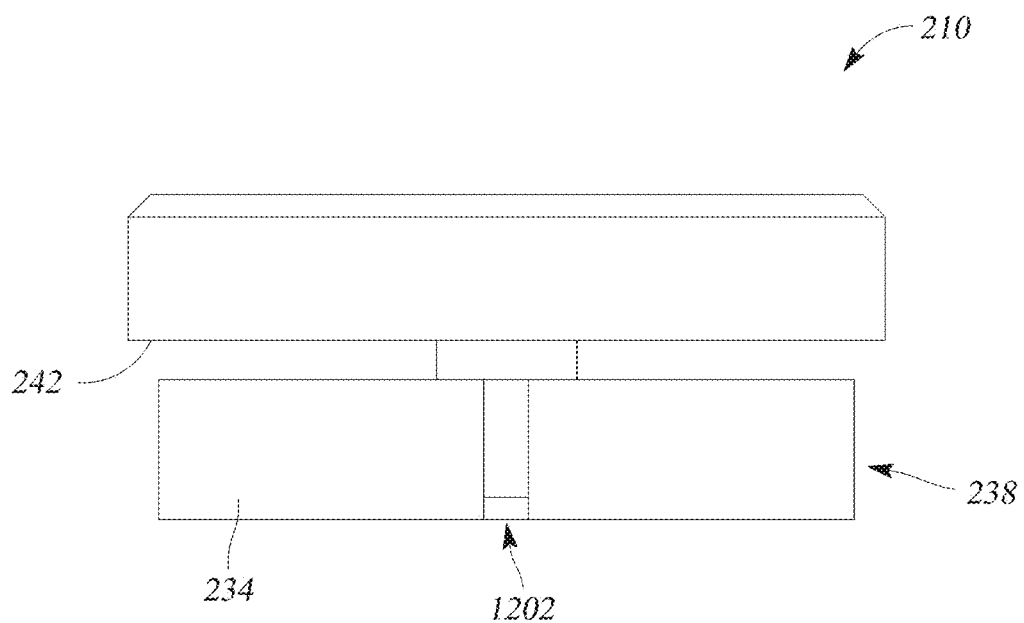
Figure 18:
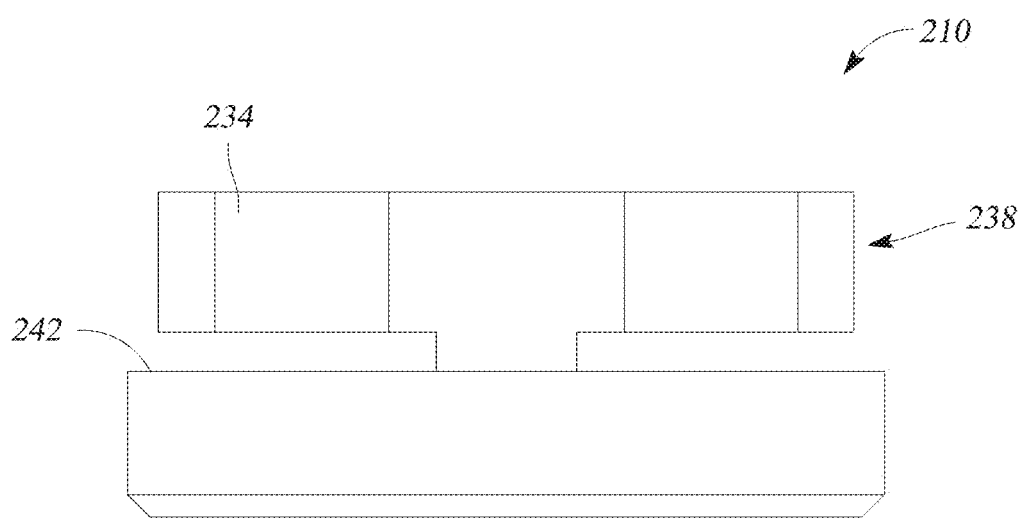

FIGS. 13-18 illustrate additional views of the radial offset insert 210 of FIG. 12. FIG. 13 illustrates a top-down view or bird's eye view of the radial offset insert 210. FIG. 14 illustrates a bottom-up view of the radial offset insert 210. FIGS. 15 and 16 illustrate side views of the radial offset insert 210. FIGS. 17 and 18 illustrate front and back views of the radial offset insert 210.

A posterior surface 242 of the offset plate 232 may be configured to contact and rotate circumferentially around an anterior surface 244 (see FIG. 4) of the guide base component 205 when the radial offset insert 210 is inserted into and angularly/rotationally oriented with respect to the guide base component 205. For example, the shoulder implant planning system 100 may determine parameters 120 including the appropriate radial offset insert offset dimension (r) and rotational orientation (beta, B) of the radial insert 210 with respect to the guide base component 205 based upon the implant and implant orientation specified by the clinician during the surgical planning stage. Indicators on the radial offset insert 210 and/or the guide base components 205 or alignment disks (as discussed in greater detail, below) may be used to position the radial offset insert 210 at the correct rotational orientation (beta, B) with respect to the guide base component 205. The indicators may indicate the rotational orientation in degrees (e.g., 0-360 degrees) or in hours of a clock (e.g., 0-12 o'clock).

Referring again to FIG. 2, the K-wire guide tube insert 215 includes a guide tube 250 and a tube plate 260. The guide tube 250 includes a central lumen that is sized to receive a K-wire (e.g., a 2.4 mm diameter K-wire, or other diameter K-wire). The angular orientation (alpha, α) of the K-wire guide tube insert 215 with respect to its tube plate 260 will vary based upon the particular K-wire guide tube insert 215 that is identified by the shoulder implant planning system. The K-wire guide tube insert 215 may have an angular orientation (alpha, α) of 0, 5, 10, 15, 20 degrees, or other angle, with respect to its tube plate 260, as shown in FIG. 19.

Figure 19:
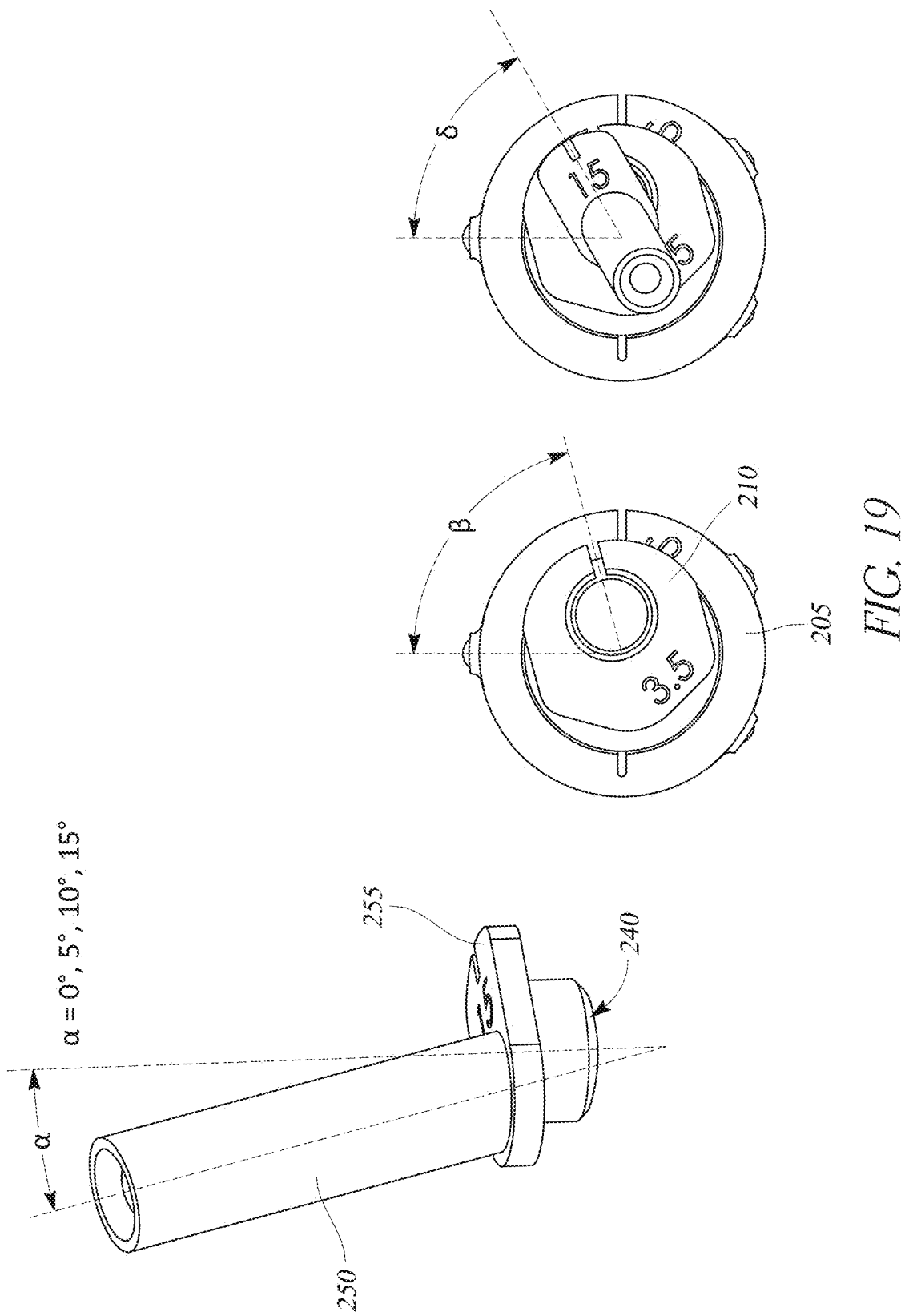
FIG. 19 illustrates one embodiment of a K-wire guide tube insert of the instrumentation components of FIG. 2.

FIGS. 19-26 illustrate additional views of the K-wire guide tube insert 215. FIG. 19 shows the K-wire guide tube insert 215 of FIG. 2. The inclination angle of the illustrated K-wire guide tube insert 215 is 15 degrees; however, the insert 215 may be provided with a tube 250 oriented at 0, 5, 10, 15 degrees, or any other angle, with respect to the plate 255. FIG. 19 also illustrates a radial offset insert 210 inserted into a guide base component 205 and oriented at an angle beta with respect to the guide base component 205. FIG. 19 also illustrates the K-wire guide tube insert 215 inserted into the radial offset insert 210, which is positioned inside of a guide base component 205. The K-wire guide tube insert 215 is oriented at an angle lambda with respect to the guide base component 205. Methods of orienting the radial offset insert 210 and the K-wire guide tube insert 215 with respect to the guide base component 205 are described in greater detail below with respect to FIGS. 29-52.

Figure 20:
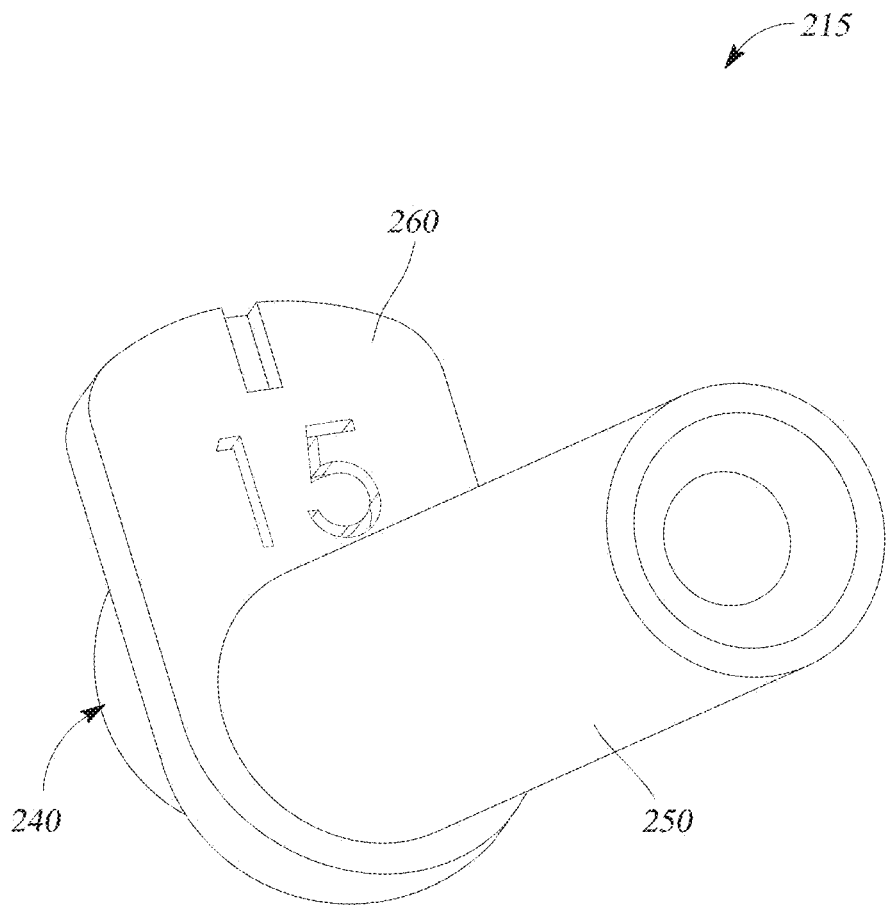
FIGS. 20-26 illustrates additional views of the radial offset insert with key locking mechanism.
Figure 21:
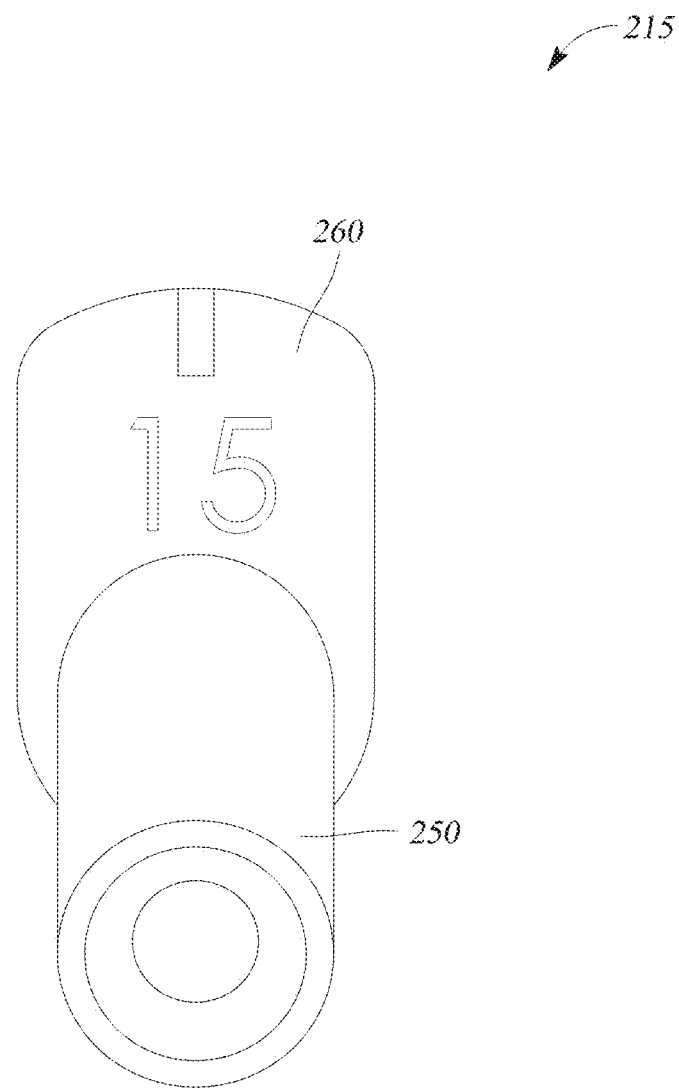
Figure 22:
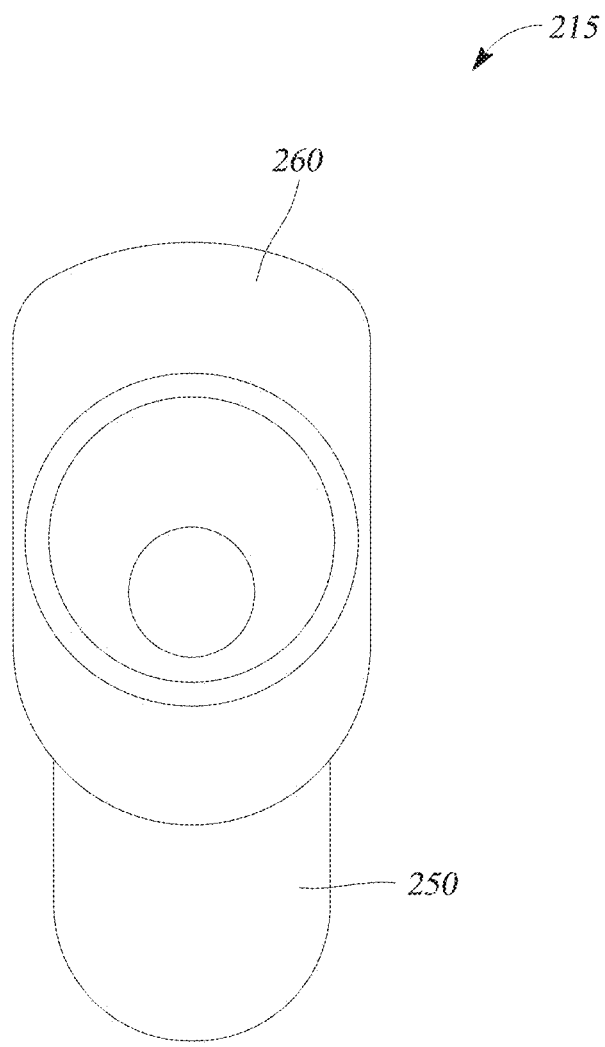
Figure 23:
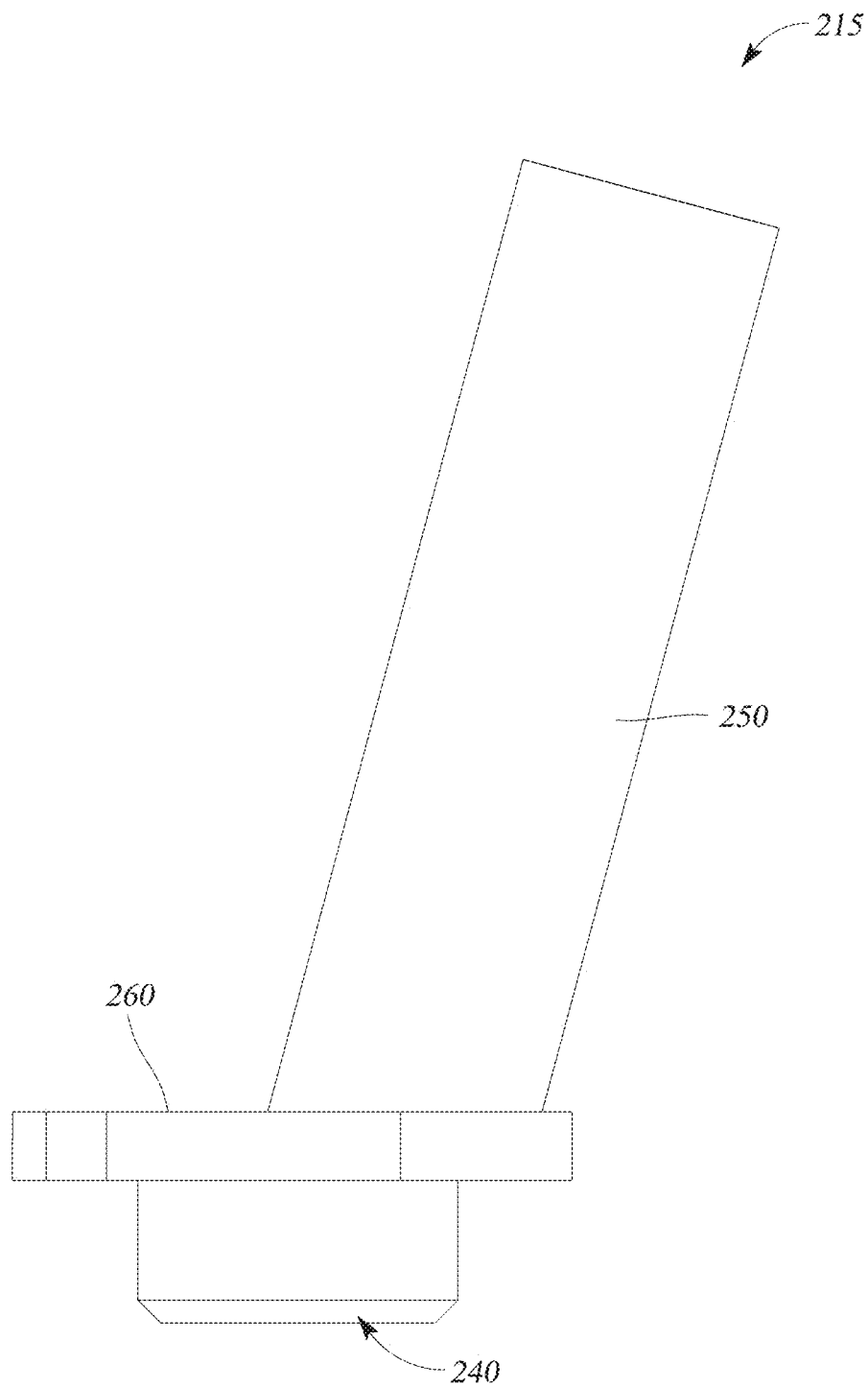
Figure 24:
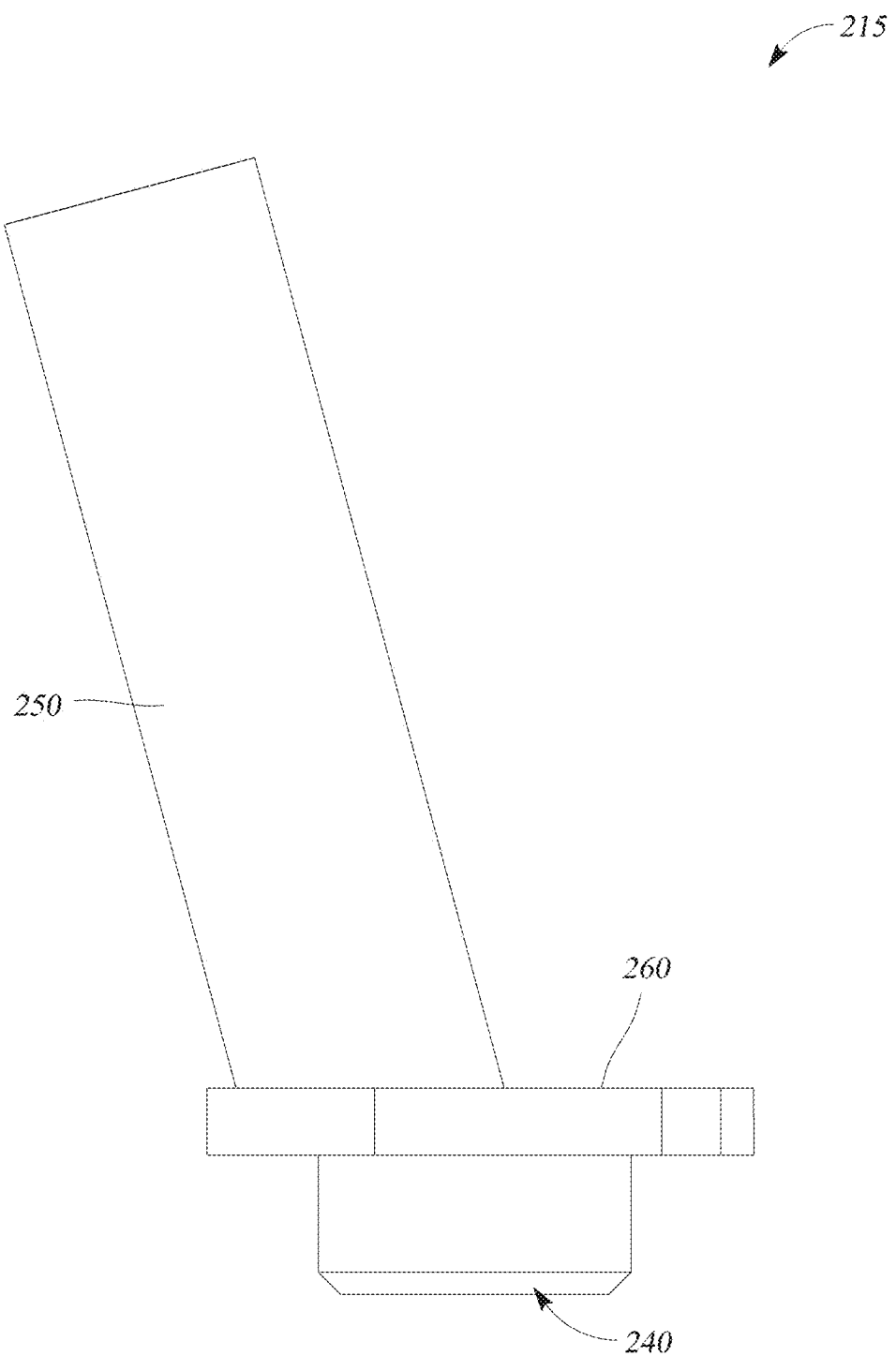
Figure 25:
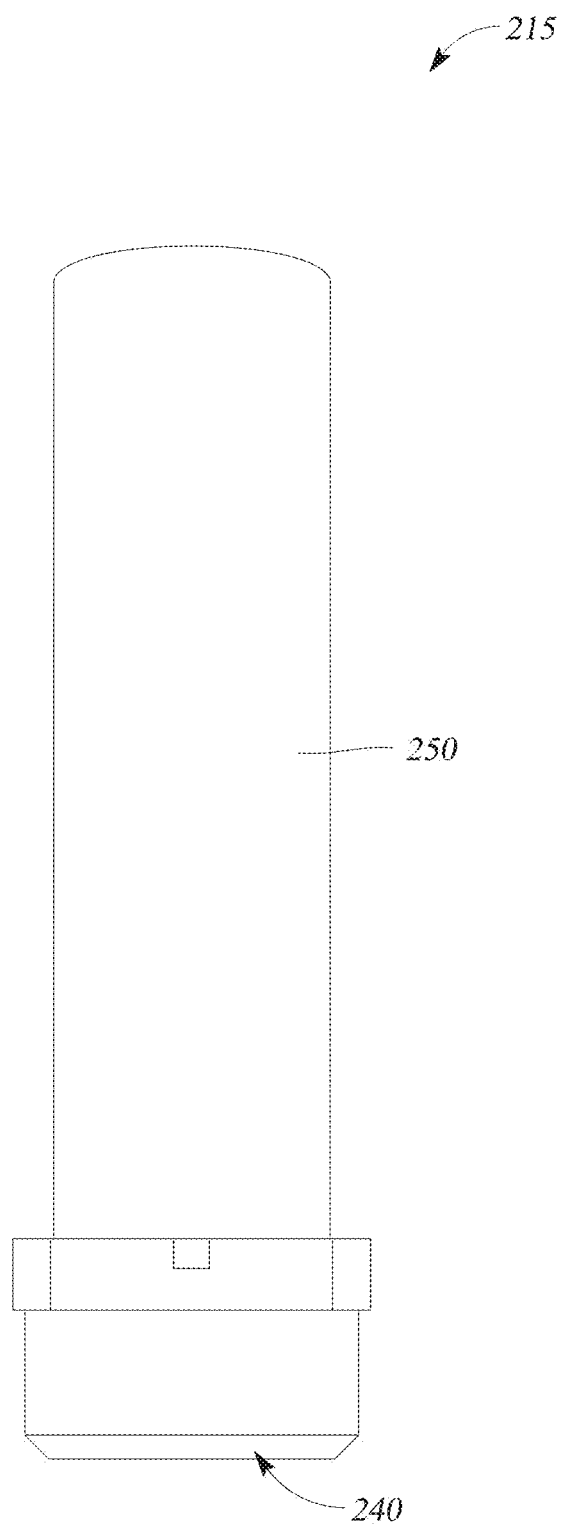
Figure 26:
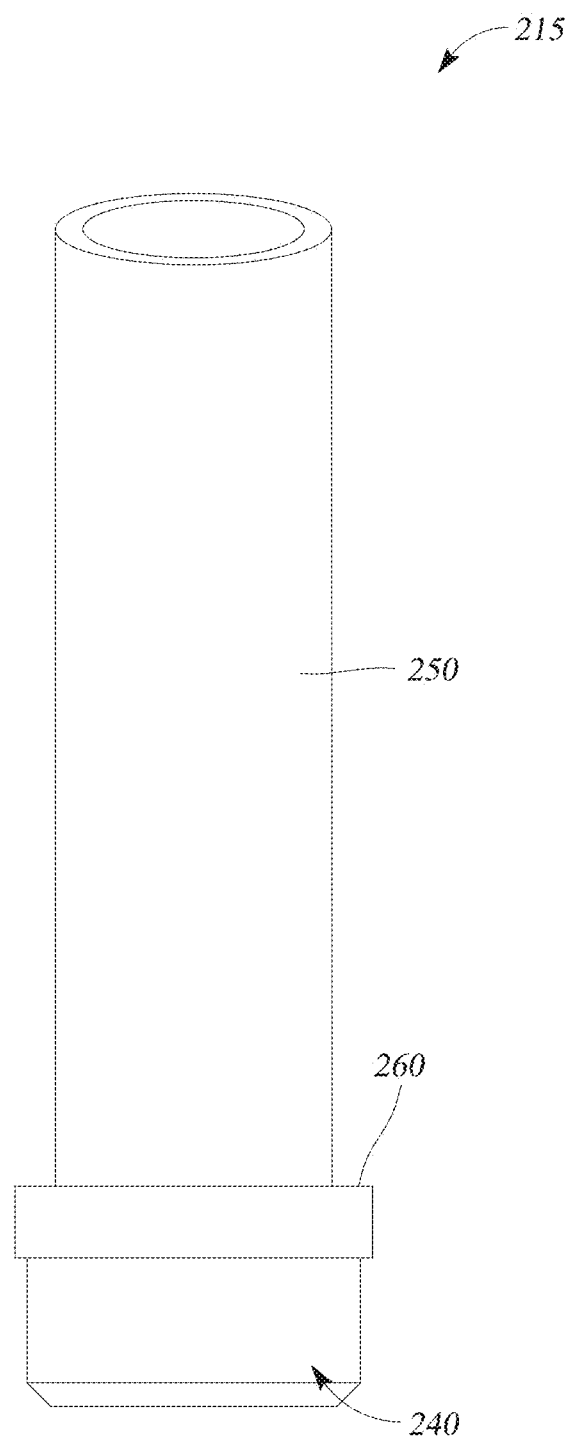

FIGS. 20-26 illustrate additional views of the K-wire guide tube insert 215 that may be used with the radial offset insert 210 of FIG. 12 and guide base component 205 of FIG. 4. FIG. 20 illustrates a perspective view of the K-wire guide tube insert 215 of FIG. 19. FIG. 21 illustrates a top-down view or bird's eye view of the K-wire guide tube insert 215 of FIG. 20. FIG. 22 illustrates a bottom-up view of the K-wire guide tube insert 215 of FIG. 20. FIGS. 23 and 24 illustrate side views of the K-wire guide tube insert 215 of FIG. 20. FIGS. 25 and 26 illustrate front and back views of the K-wire guide tube insert 215 of FIG. 20.

The selected K-wire guide tube 250 also has a cylindrical attachment region 240 that is sized to fit within and rotate with respect to the cylindrical cavity 236 (e.g., see FIG. 13) of a radial offset insert 210. The K-wire guide tube insert 215 may optionally have an indicator (e.g., located on its tube plate 260) to enable rotational alignment of the K-wire guide tube insert 215 with respect to the guide base component. The angular rotational alignment (lambda, δ) may be specified in degrees (e.g., 0-360 degrees) or in hours of a clock (e.g., 0-12 o'clock).

Figure 27:
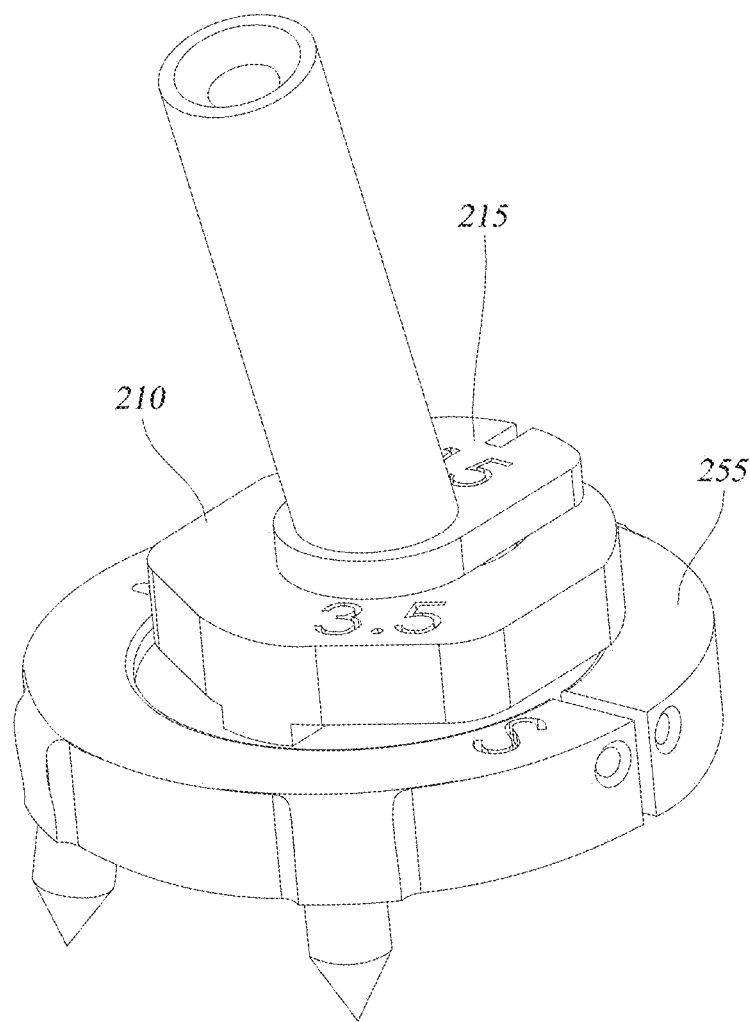
FIG. 27 illustrates one embodiment of the components of the instrumentation components of FIG. 2 assembled together and oriented with respect to each other.
Figure 28:
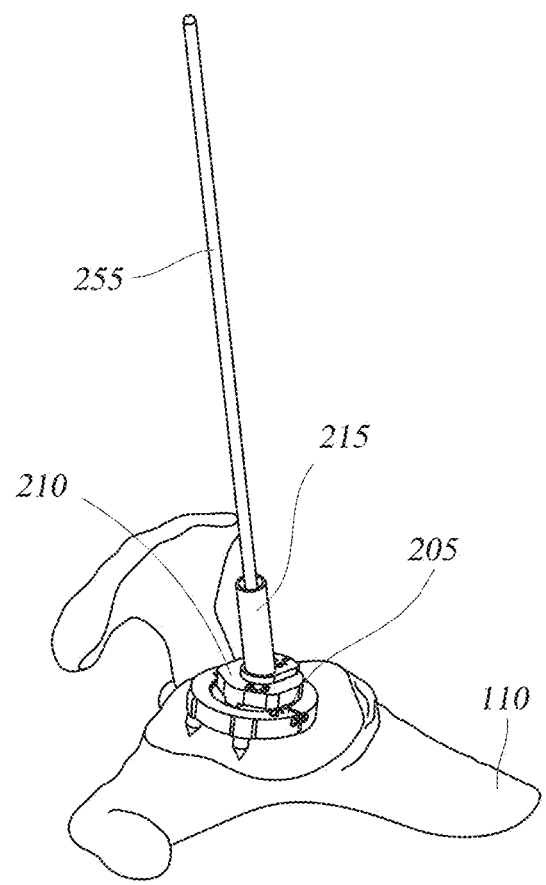
FIG. 28 illustrates one embodiment of the selected components of the instrumentation components of FIG. 27 assembled together, positioned over a glenoid, and having a K-wire inserted into the instrumentation components.

FIGS. 27 and 28 illustrate the selected components of the instrumentation components of FIG. 2 assembled together and oriented with respect to each other according to the parameters 120 determined by the shoulder implant planning system 100 of FIG. 1. FIG. 27 illustrates an assembled, customizable, reusable alignment tool assembled from the guide base component 205, radial offset insert 210, and K-wire guide tube insert 215, described above. Once the components 205, 210, 215 are assembled and secured together, they may be used by a clinician to guide the placement and angular orientation of a K-wire with respect to a patient's glenoid. Orientation of the radial offset insert 210 and K-wire guide tube insert 215 with respect to the guide base component 205 may be achieved by using one or more alignment plates, or orientation guides, as described in greater detail below with respect to FIGS. 29-52.

Figure 29:
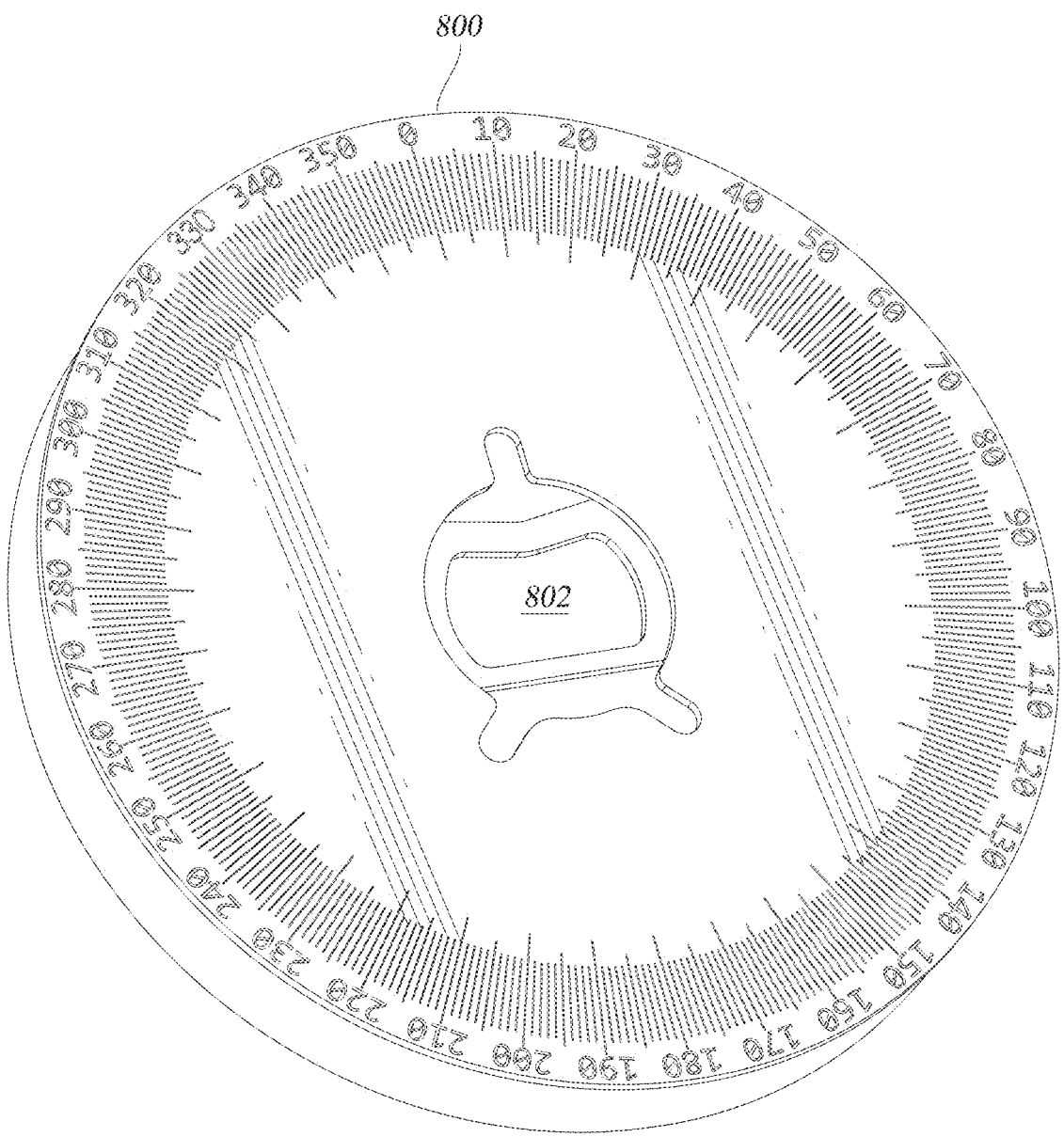
FIG. 29-52 illustrates radial orientation guides used to rotationally orient the instrument components of FIG. 2 with respect to each other.
Figure 30:
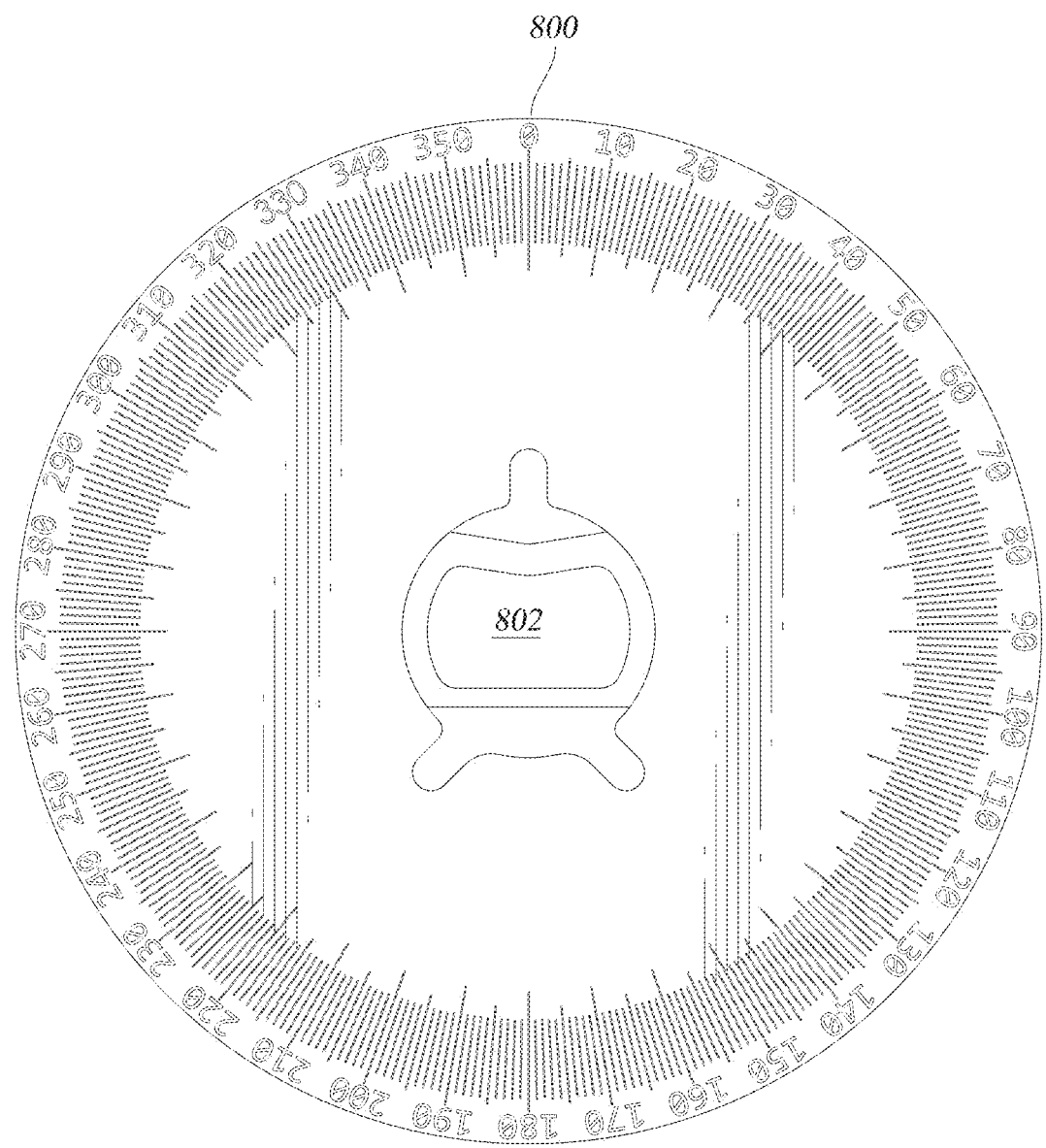
Figure 31:
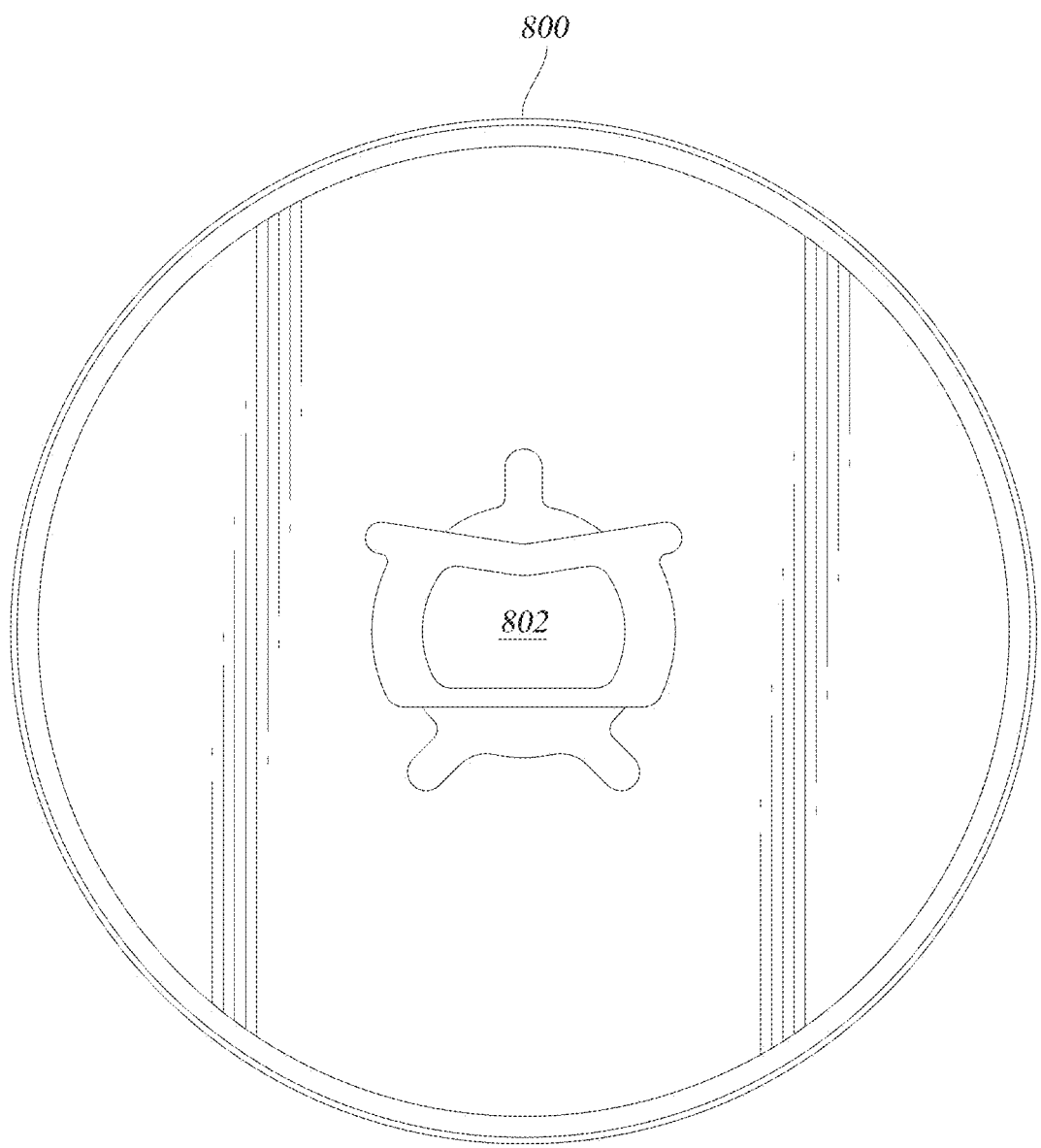
Figure 32:
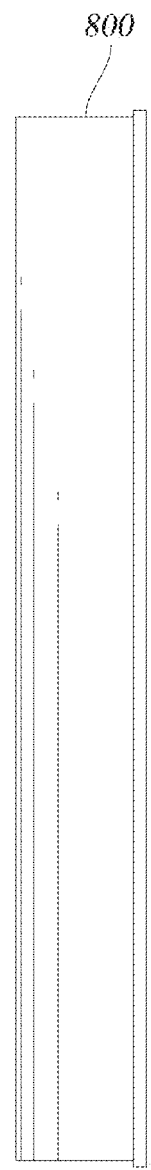
Figure 33:
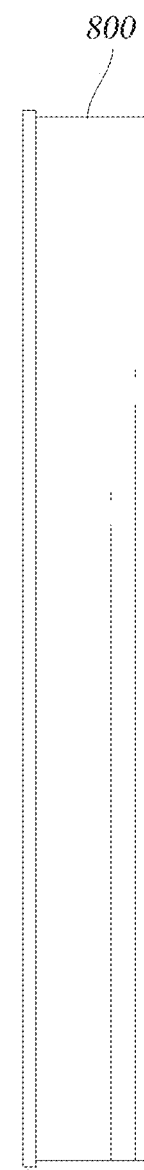
Figure 34:
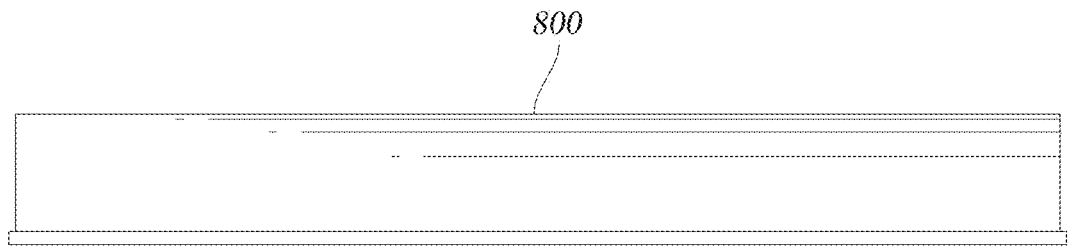
Figure 35:
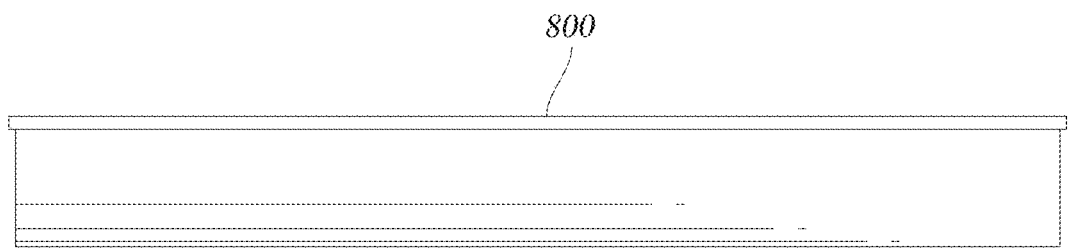

FIGS. 29-35 illustrate an example alignment compass base 800. As shown in FIG. 29, alignment compass base 800 includes an opening 802 configured to receive base component 205 and rotational orientation markers (in degrees). In some embodiments, alignment compass base 800 may be configured to receive guide base component 205 such that the pin-like foot 220 positioned at the superior aspect of the guide base component 205 may be at 0 degrees. The front of the alignment compass base 800 includes markings that indicate an angular orientation of the radial offset insert 210 and K-wire guide tube insert 215 with respect to a guide base component 205. In some embodiments, radial offset insert 210 and subsequent components may be placed and orientated while guide base component 205 is placed within alignment compass base 800, as discussed below. FIGS. 30-35 illustrate additional views of the alignment compass base 800 that may be used to rotationally orient guide base component 205, a radial offset insert 210, and a K-wire guide tube insert 215 with respect to each other. FIG. 30 illustrates a top-down view or bird's eye view of alignment compass base 800. FIG. 31 illustrates a bottom-up view of alignment compass base 800. FIGS. 32 and 33 illustrate side views of the alignment compass base 800. FIGS. 34 and 35 illustrate top and bottom views of the alignment compass base 800.

Figure 36:
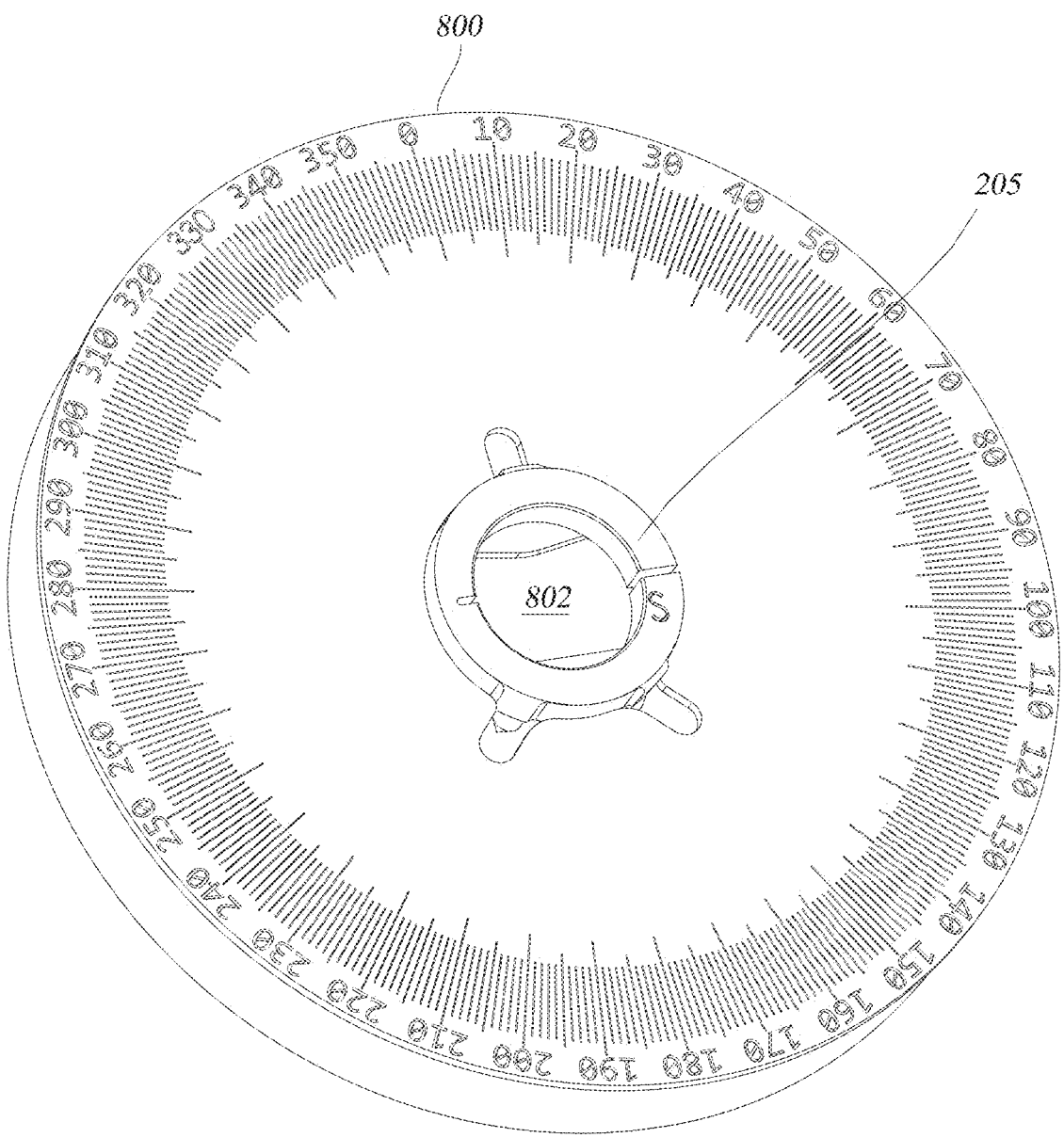

FIG. 36 illustrates placement of guide base component 205 within the opening 802 of the alignment compass base 800. When inserted into the opening 802, the guide base component 205 is oriented at 0 degrees with respect to the alignment compass base 800.

Figure 37:
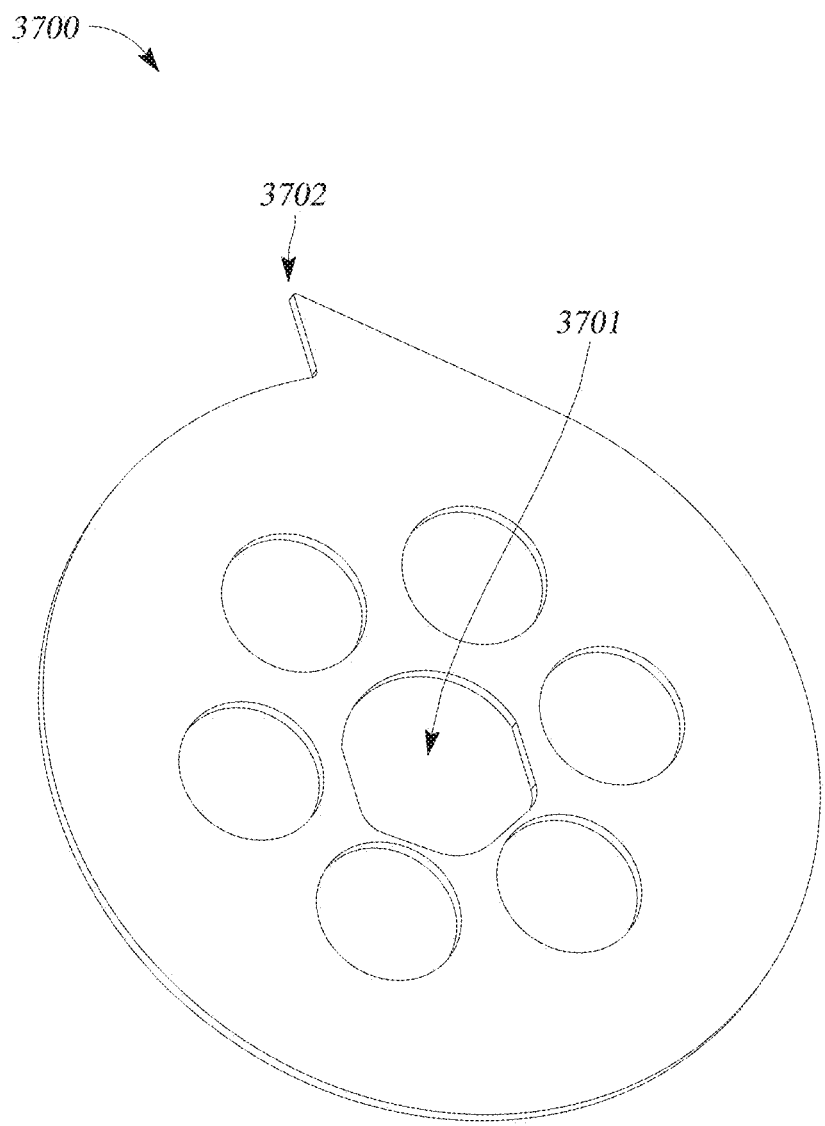
Figure 38:
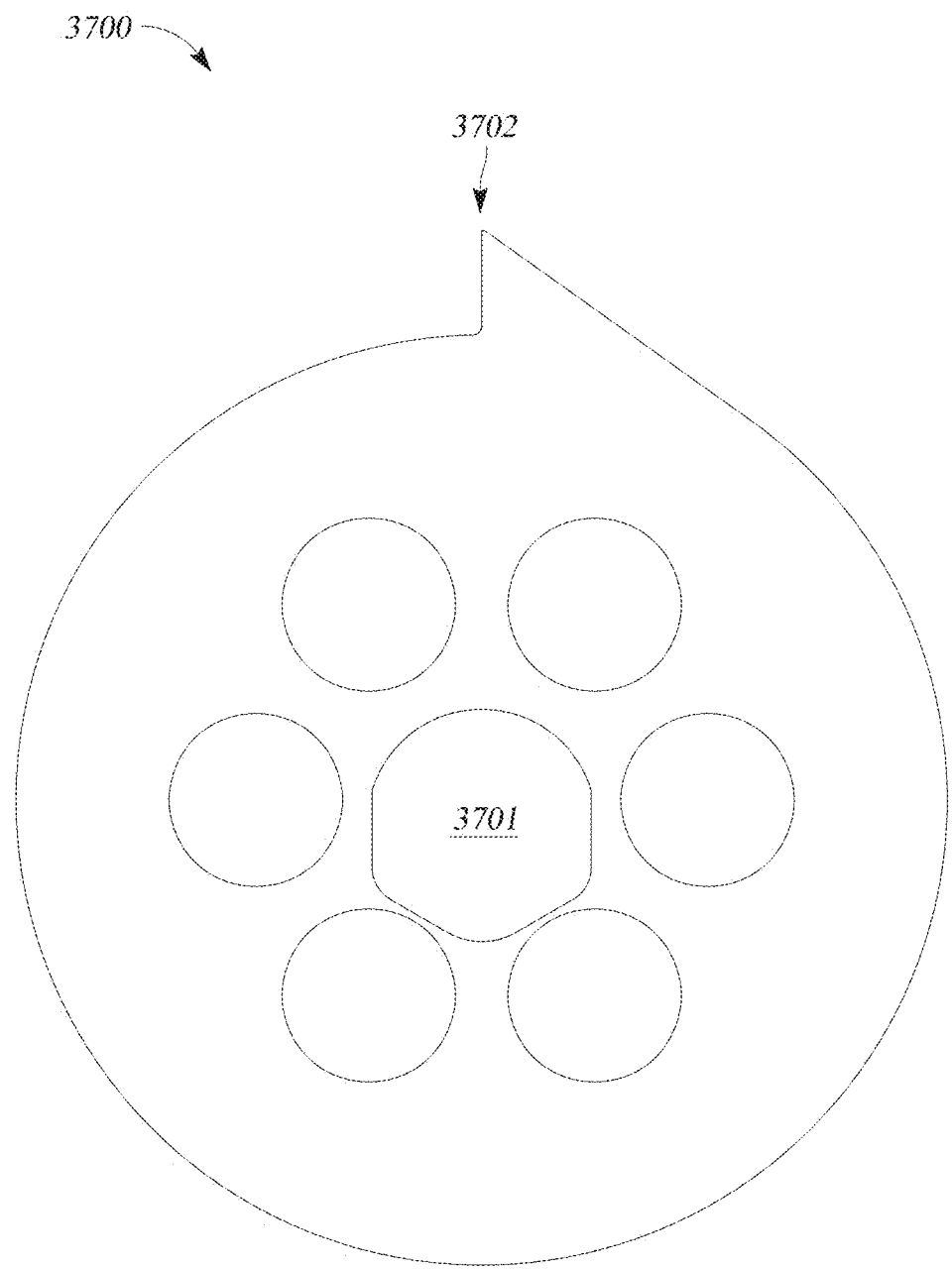
Figure 39:
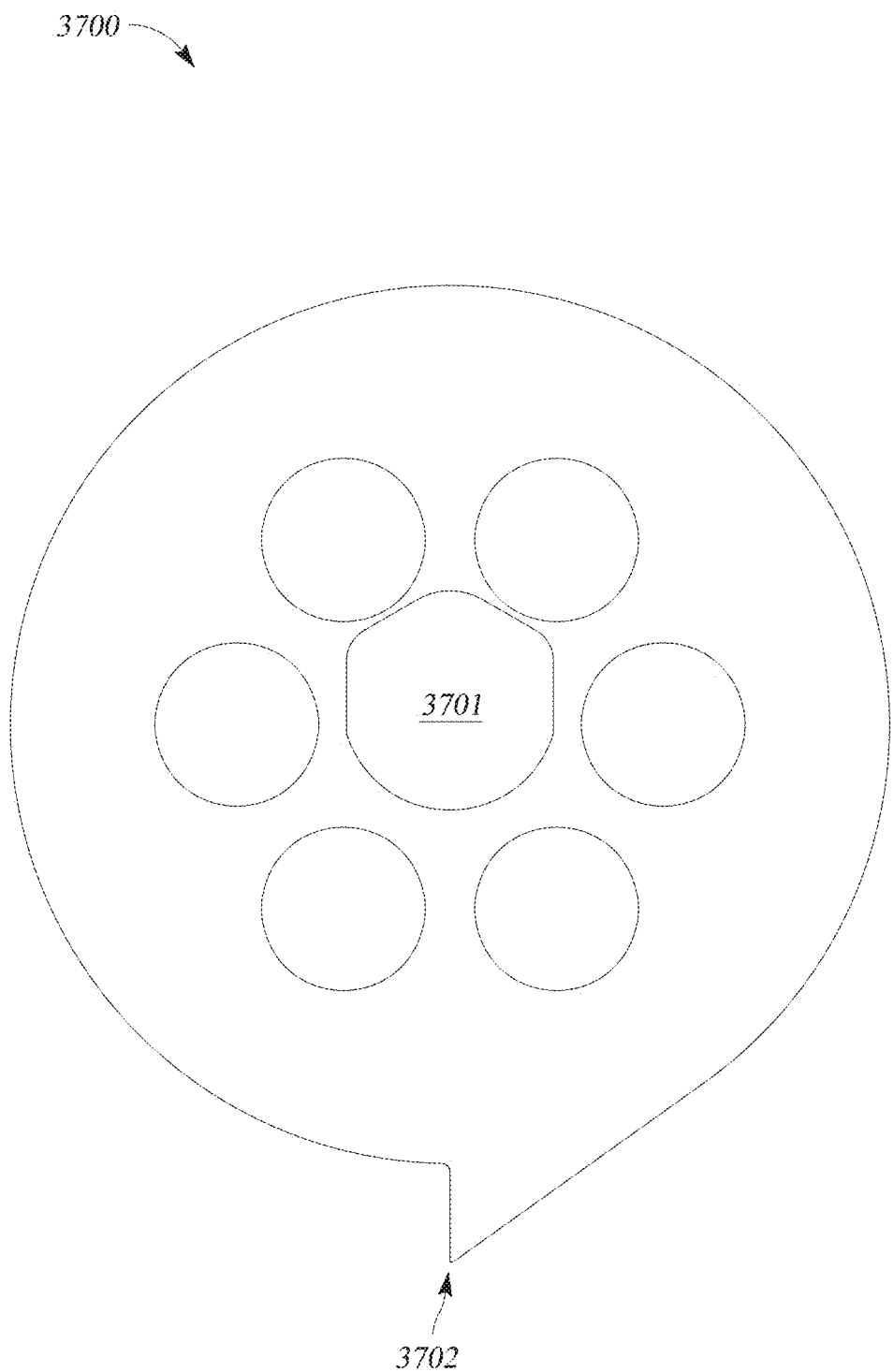
Figure 40:
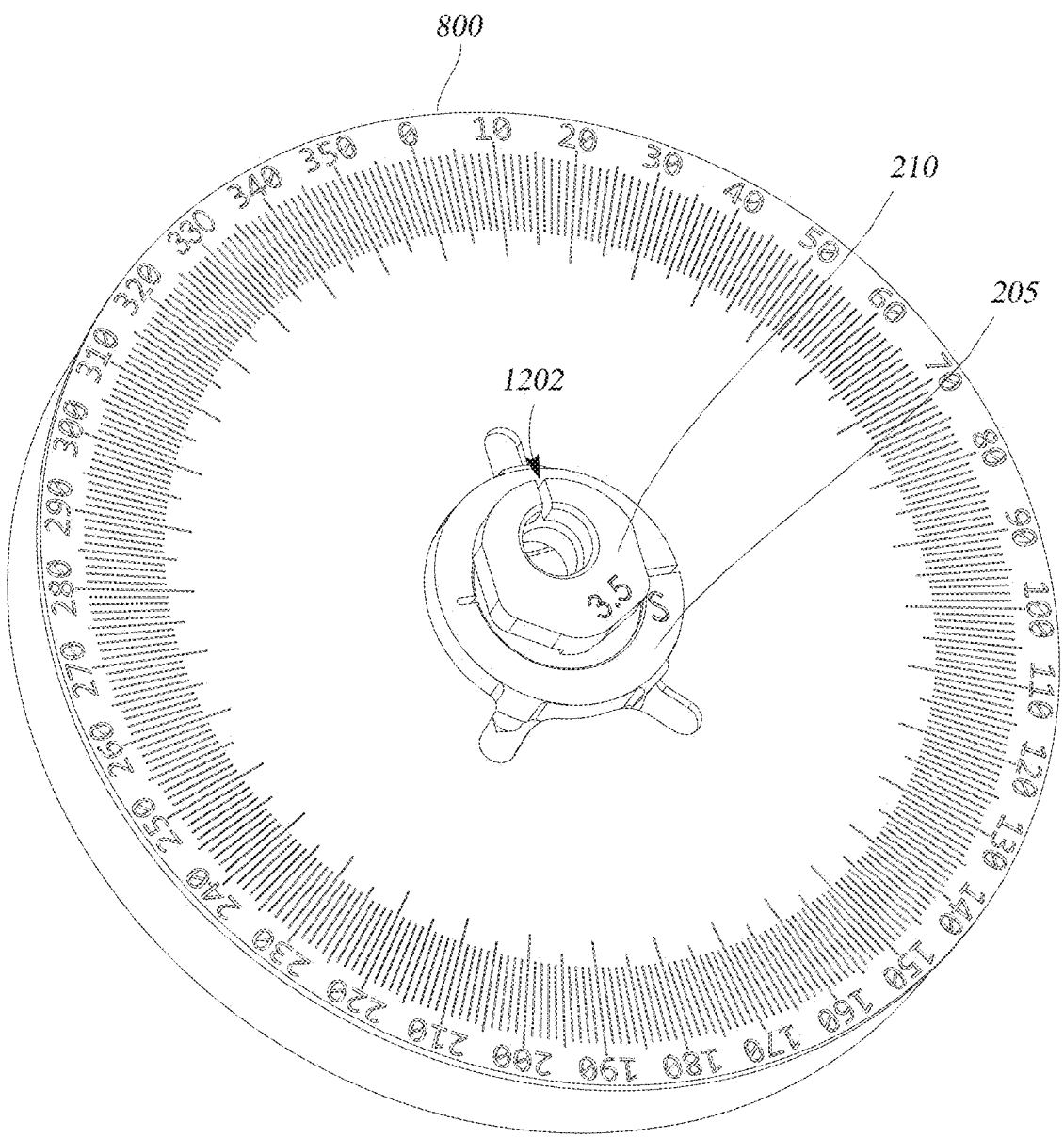
Figure 41:
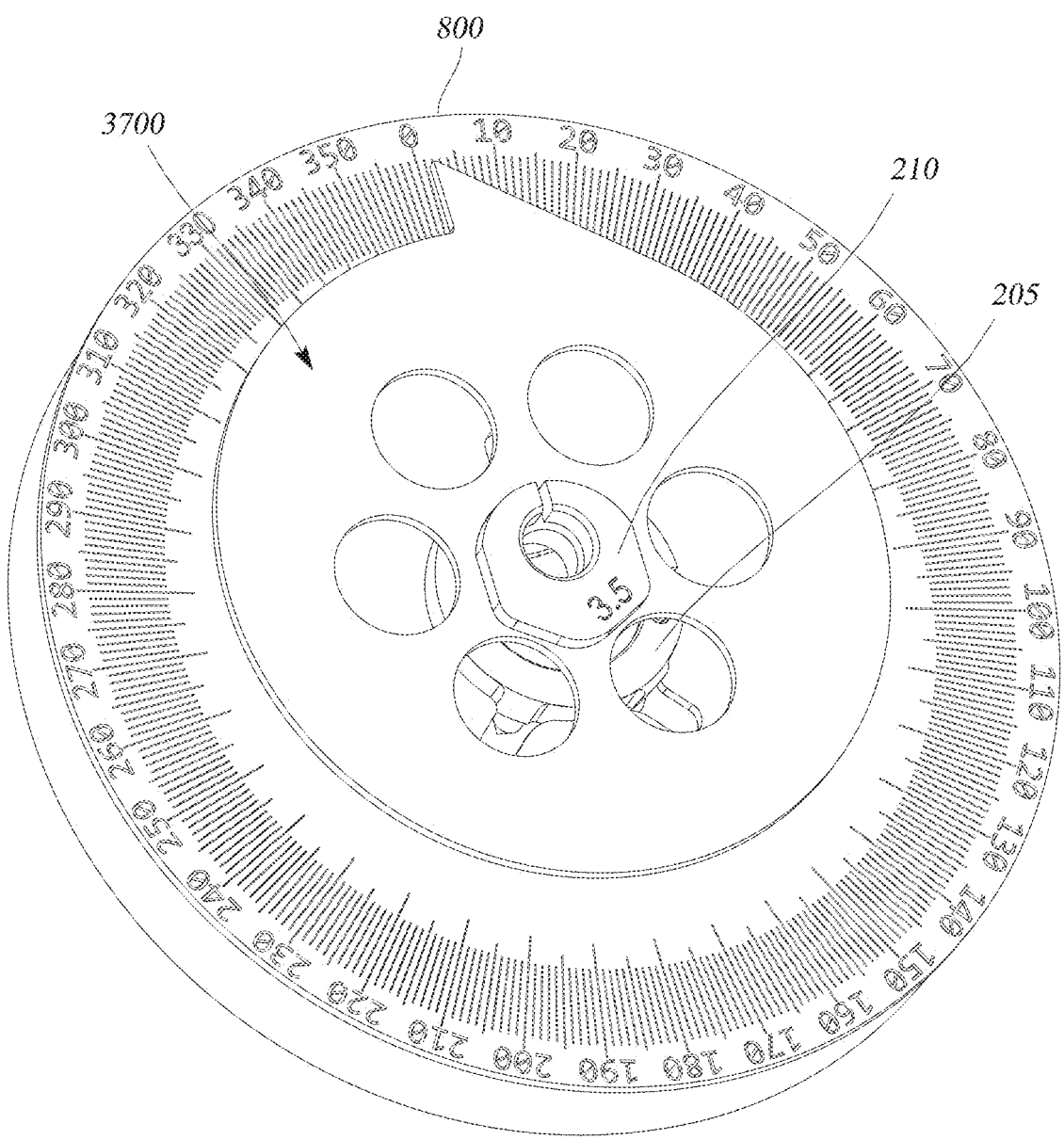

FIGS. 37-39 illustrate an example radial pointer, or alignment plate, 3700 that may be used to align the radial offset insert 210 with respect to the guide base component 205. As shown in FIG. 37, radial pointer 3700 includes radial offset insert opening 3701 and an angular indicator tip 3702. In some examples, radial pointer 3700 may be configured to rotate radial offset insert 210 with respect to guide base component 205. For example, after the guide base component 205 is inserted into the alignment compass base 800 and adjusted to an "open configuration," radial offset insert 210 is inserted into the opening of the guide base component 205. The radial pointer 3700 may be temporarily positioned over the radial offset insert 210 and rotated with respect to the alignment compass base 800 until the angular indicator tip 3702 is aligned with a desired angular indicator on the alignment compass base 800. Once in place, the radial offset insert 210 is locked in place (e.g., the key is rotated to the closed position and removed from the slot 402 in the guide base component 205). FIG. 40 illustrates placement of radial offset insert 210 within guide base component 205, which is positioned within the alignment compass base 800. In some examples, radial offset cutout 3701 may fit around the radial offset insert 210 such that the sides of the offset plate 232 may contact the sides of radial offset opening 3701. Once the radial offset opening 3701 is placed over the radial offset insert 210, radial pointer 3700 may be rotated such that the angular orientation of radial offset insert 210 is changed with respect to the guide base component 205. FIG. 41 illustrates placement of radial pointer 3700 on radial offset insert 210 in an example configuration.

As noted above, the shoulder implant planning system 100 may determine parameters 120 including the appropriate radial offset insert offset dimension (r) and rotational orientation (beta, β) of the radial insert 210 with respect to the guide base component 205 based upon the implant and implant orientation specified by the clinician during the surgical planning stage. In some embodiments, radial tip 3702 may be used to set the rotational orientation of radial offset insert 210. For example, by rotating radial pointer 3700 such that the radial tip 3702 lines up with a specified degree on the rotational orientation markers on alignment compass base 800, the angular orientation of radial offset insert 210 may be adjusted.

Figure 42:
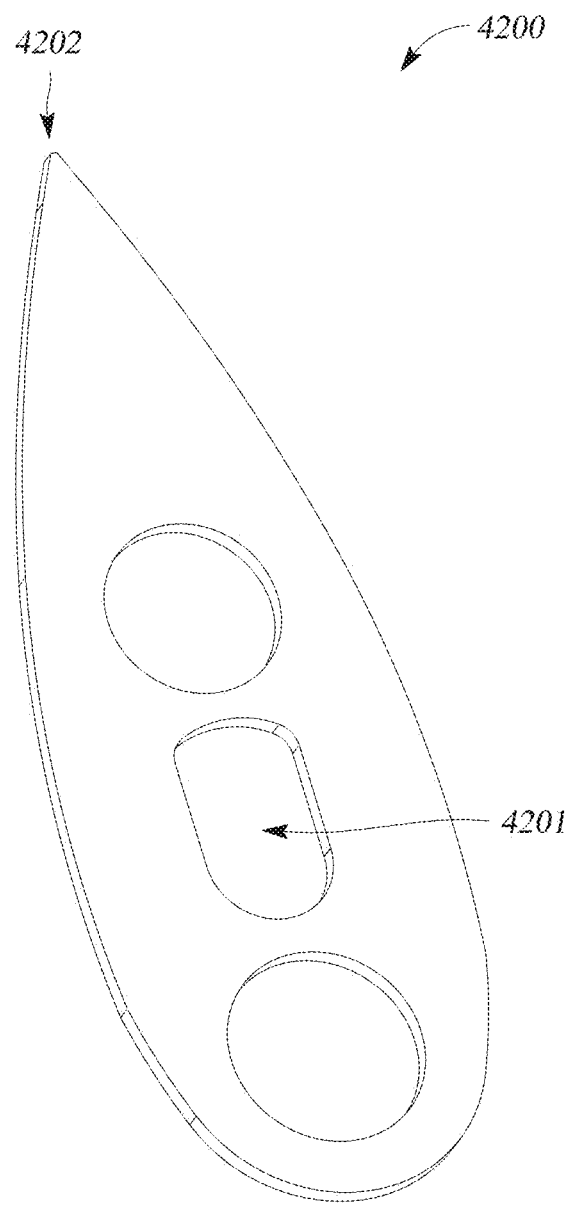
Figure 43:
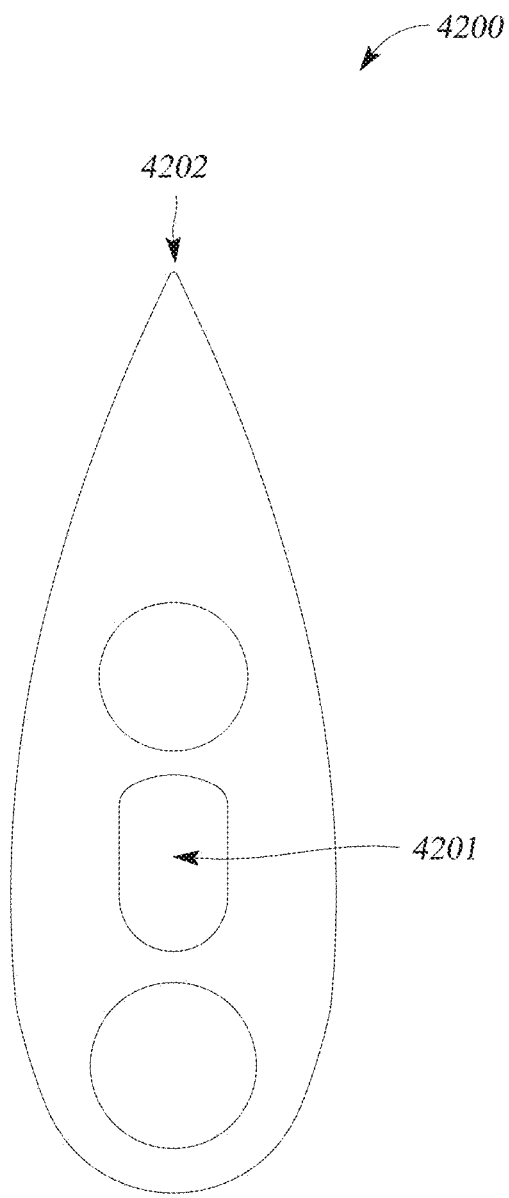
Figure 44:
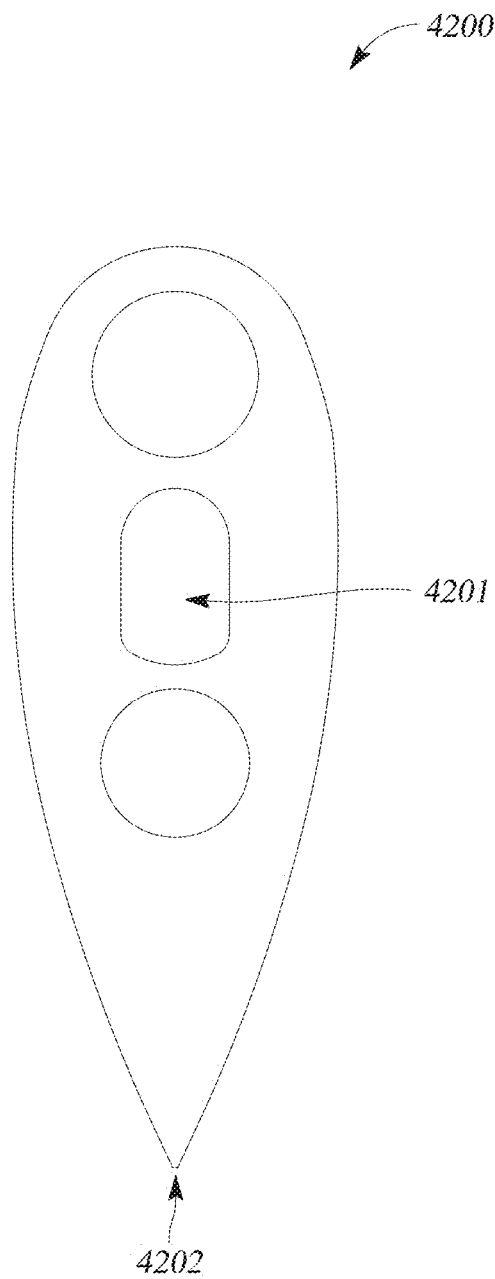
Figure 45:
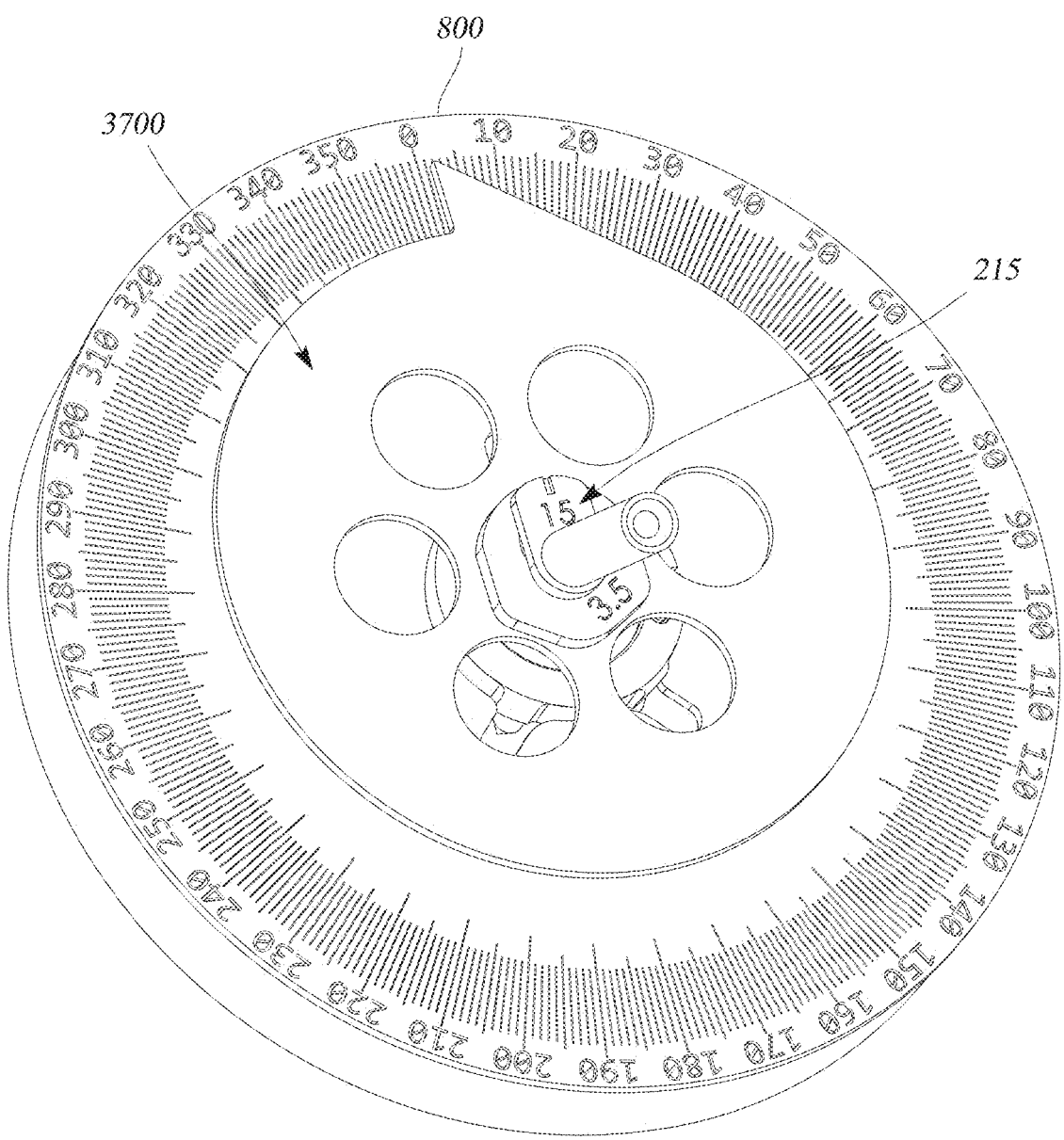

FIGS. 42-44 illustrate an example K-wire pointer, or alignment plate, 4200. As shown in FIG. 42, K-wire pointer 4200 includes K-wire guide tube opening 4201, K-wire pointer tip, or angular alignment indicator tip, 4202. In some examples, K-wire pointer 4200 may be configured to rotate the K-wire guide tube insert 215 with respect to the radial offset insert 210 and guide base component 205. For example, after radial offset insert 210 is oriented and locked atop guide base component 205, a key may be inserted into the slot 1202 of the radial offset insert 210 and rotated to configure radial offset insert 210 in an open configuration. K-wire guide tube insert 215 may then be placed within cylindrical cavity 236 of the radial offset insert 210, as shown in FIG. 45.

Figure 46:
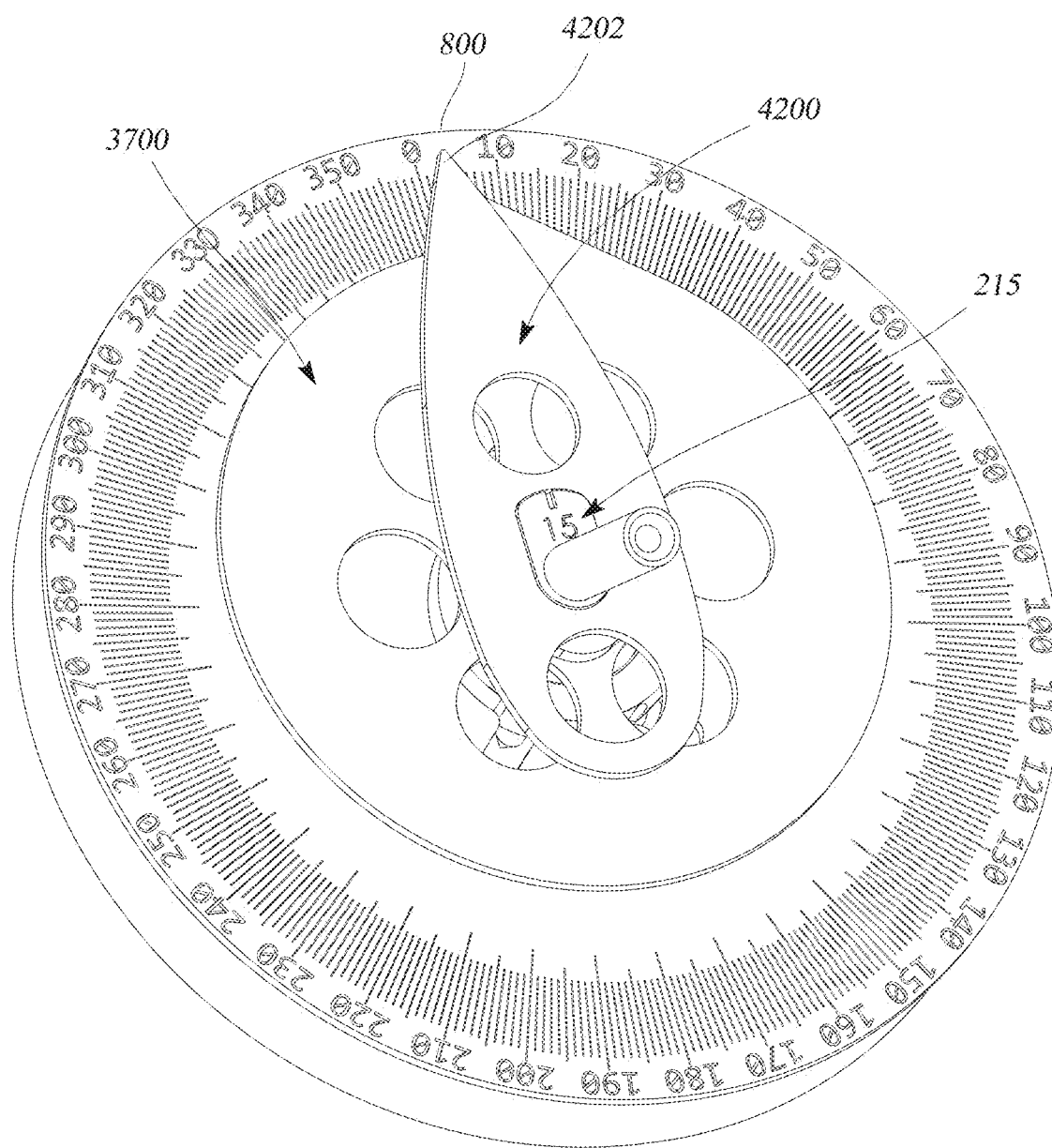
Figure 47:
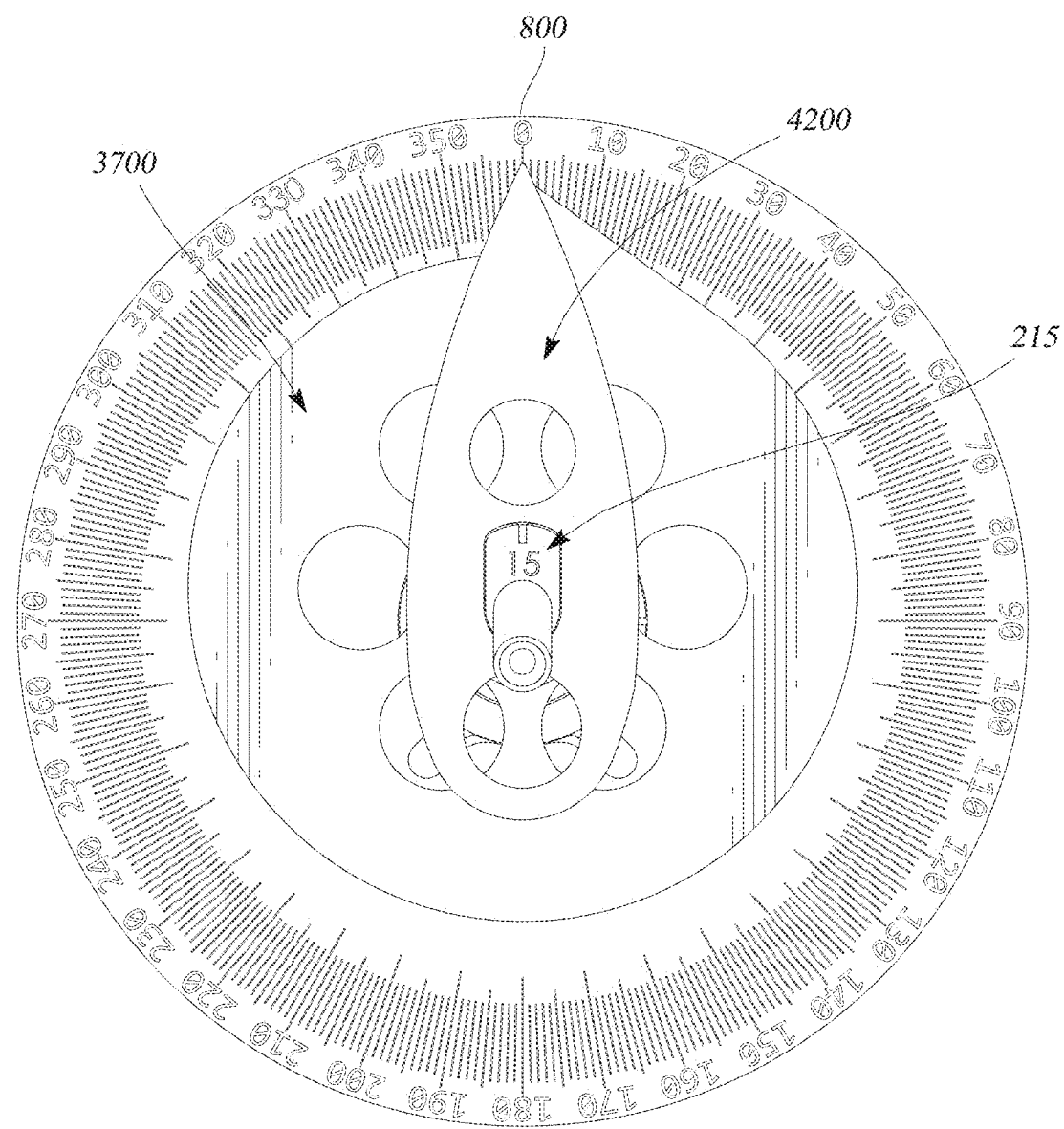
Figure 48:
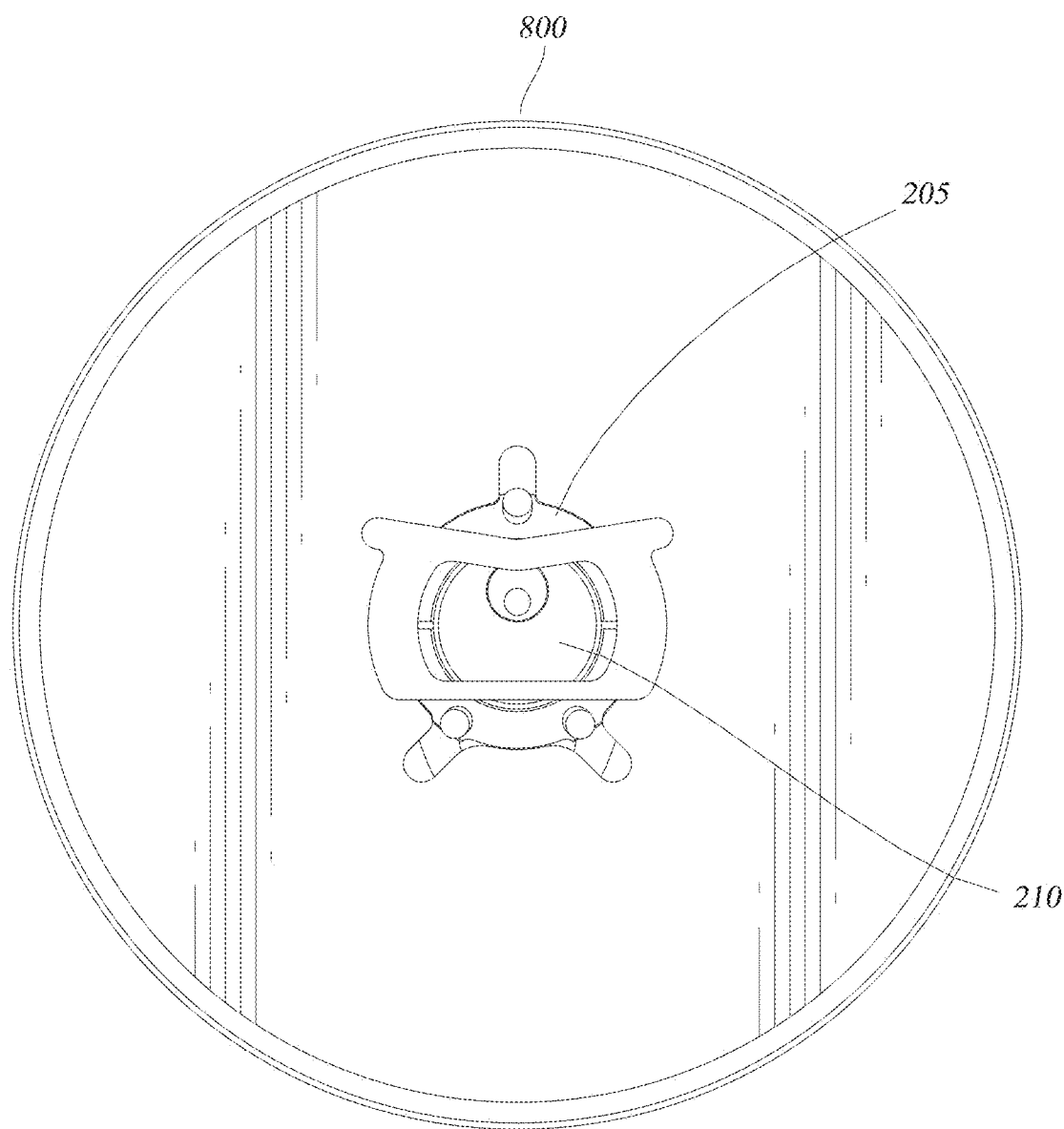
Figure 49:
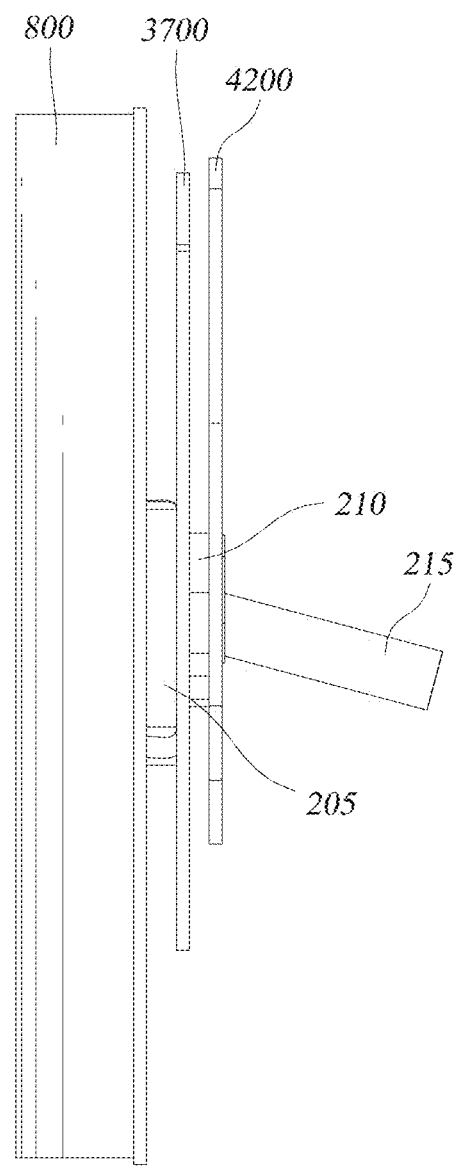
Figure 50:
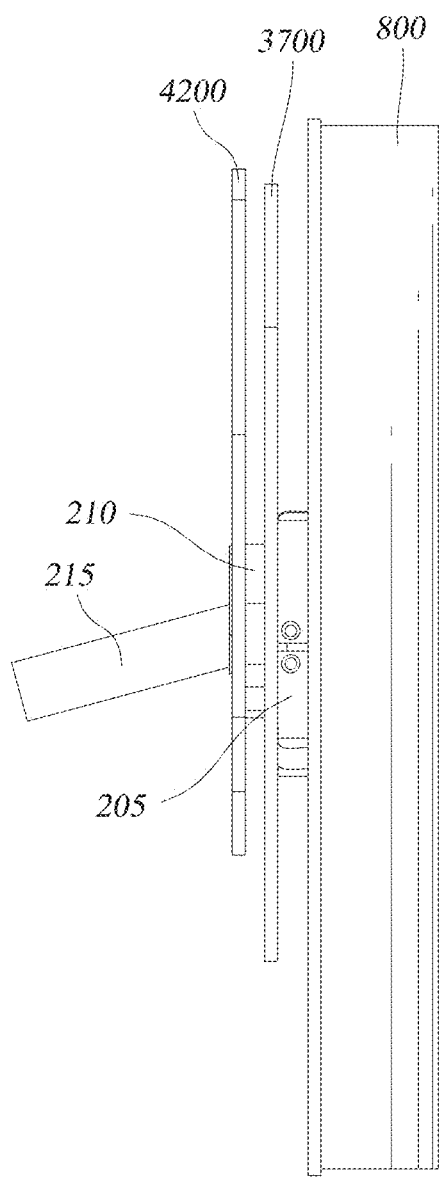
Figure 51:
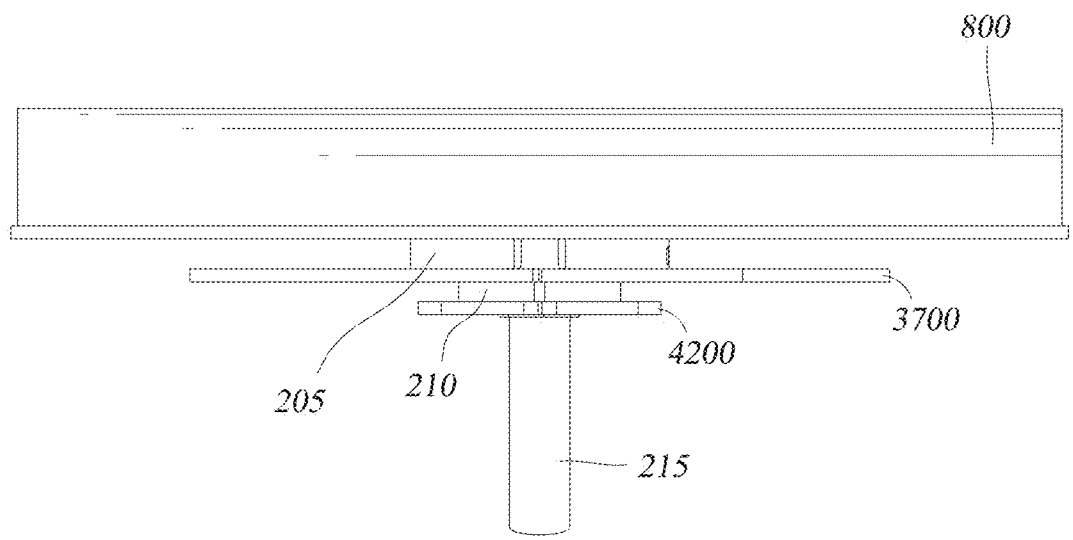
Figure 52:
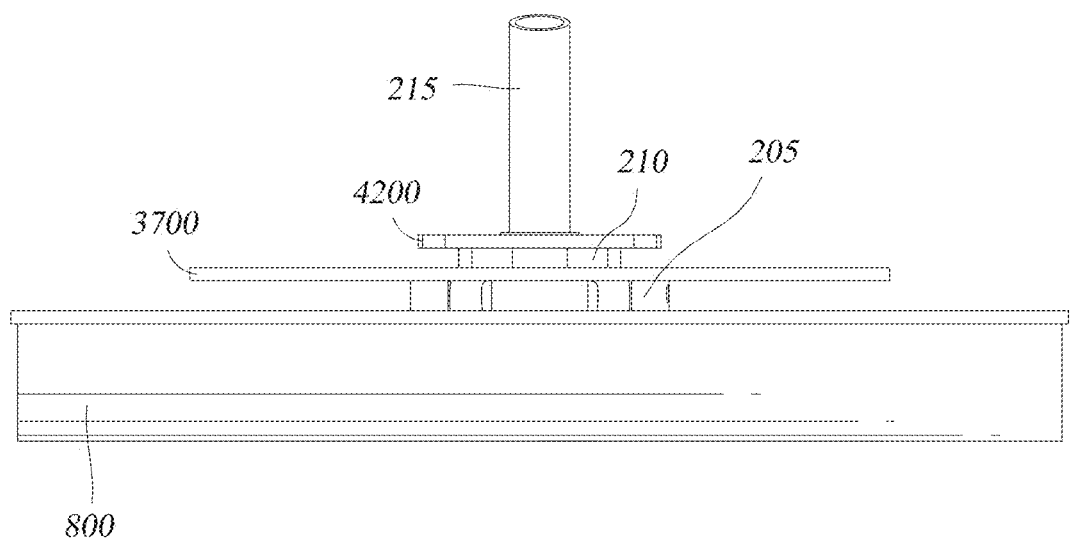

The K-wire pointer 4200 may then be placed over the K-wire guide tube insert 215, as shown in FIG. 46. In this example, the K-wire pointer 4200 may be used to orient the K-wire guide tube insert 215 to a desired angle before it is locked in place (e.g., before the key is rotated to close and removed from the radial offset insert 210). In some examples, K-wire pointer 4200 may fit around the K-wire guide tube insert 215 such that the sides of the tube plate 260 contact with the sides of K-wire guide tube opening 4201. In some embodiments, once the K-wire guide tube opening 4201 is placed over the K-wire guide tube insert 215, the K-wire pointer tip 4202 may be rotated such that the angular orientation of the K-wire guide tube insert 215 is changed with respect to the radial offset insert 210 and the guide base component 205. FIG. 46 illustrates placement of the K-wire pointer 4200 on the K-wire guide tube insert 215 in an example configuration.

The shoulder implant planning system 100 determines the version and inclination of the implant during the surgical planning and simulation stage, as well. The shoulder implant planning system determines the implant version and inclination based upon the placement and orientation of the implant used by the clinician in the virtual glenoid model. The shoulder implant planning system 100 can convert the implant version and inclination to a corresponding angular orientation (alpha, α) and rotational orientation (lambda, β) of a K-wire tube 250 of a K-wire guide tube insert 215 with respect to the guide base component 205. The angular and rotational orientation of the K-wire tube 250 with respect to the guide base component 205 assure that when a K-wire 255 is inserted into the K-wire tube 250, it will be positioned at the correct orientation. The correct orientation allows drilling of the glenoid to achieve the implant pin position and orientation specified by the clinician via the shoulder implant planning system 100. In some embodiments, the K-wire pointer tip 4202 may be used to set the rotational orientation of the K-wire guide tube insert 215 with respect to the guide base component 205. For example, by adjusting the K-wire pointer 4200 such that the K-wire pointer tip 4202 lines up with a specified degree indicator on the rotational orientation markers on alignment compass base 800, the angular orientation of K-wire guide tube insert 215 may be adjusted.

FIGS. 47-52 illustrate additional views of a fully assembled selected components of the instrumentation components of FIG. 2 and orientation guides.

The shoulder implant planning system 100 and instrumentation components 200 may be used by the clinician to plan and simulate a shoulder replacement surgical procedure, specify the exact instrumentation to be used to complete the surgical procedure, specify exactly how each component of the instrumentation is to be oriented with respect to each other (as shown in FIG. 27), and then allow the clinician to complete the surgical procedure using the specified instrumentation. For example, when complete, the K-wire guide tube will be positioned and angularly oriented on the patient' glenoid such that the clinician may insert a K-wire 255 into the K-wire guide tube 250, remove all the instrumentation components 200, and complete the implant surgery to achieve the same result achieved during planning and simulation with the virtual glenoid model.

Figure 53:
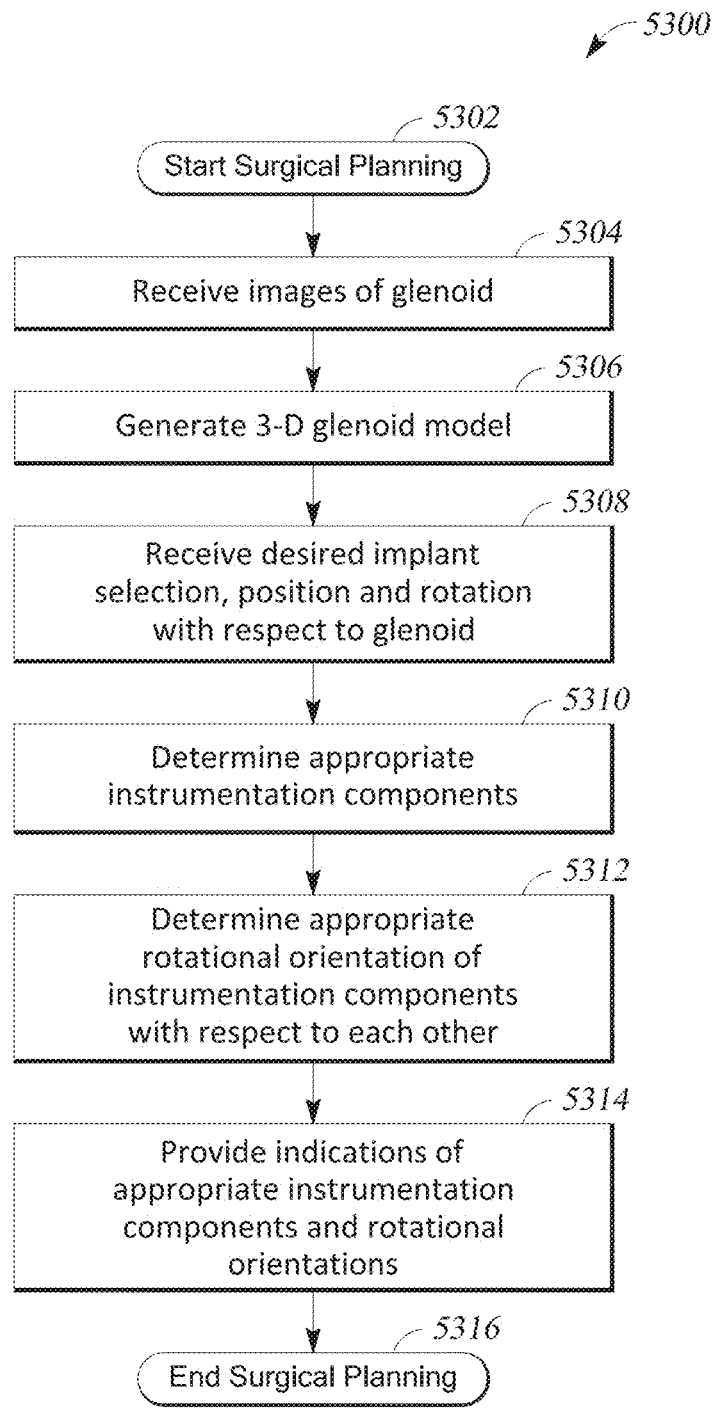
FIG. 53 illustrates one embodiment of a method of surgical planning using the surgical planning system of FIG. 1.

In one embodiment, a method of surgical planning 5300 using the shoulder implant planning system 100 is illustrated in FIG. 53. The shoulder implant planning system receives images of the patient's glenoid 5304 to create a virtual glenoid model 5306. The shoulder implant planning system also receives an indication of a desired implant, a desired implant location, and desired implant angular orientation (e.g., version and inclination) 5308. Using this information, the shoulder implant planning system determines: (1) an appropriate guide base component having a predetermined size, (2) an appropriate radial offset insert having a predetermined offset value (r), (3) an appropriate rotational orientation (beta, β) of the radial offset insert with respect to the guide base component, (4) an appropriate K-wire guide tube insert having guide tube inclined at a predetermined angular orientation (alpha, α) with respect to a tube base plate, and (5) an appropriate rotational orientation (lambda, δ) of the K-wire guide tube insert with respect to the guide base component 5310, 5312. These values and component identifications may be provided to the clinician via an output display of the shoulder implant planning system.

During the surgical procedure, the clinician selects the appropriate guide base component, radial offset insert, and K-wire guide tube from a stock or kit of standard, reusable instrumentation components. The clinician surgically accesses the patient glenoid and positions the guide base component at the appropriate location. The radial offset component is inserted into the guide base component and rotated with respect to the guide base component to the specified rotational orientation (beta, β). The K-wire guide tube insert is inserted into the cylindrical cavity of the radial offset insert and rotated with respect to the guide base component to the specified rotational orientation (lambda, δ). The clinician then activates the locking mechanism of the guide base component to lock the instrumentation components into a fixed position with respect to each other.

The clinician may then insert a K-wire through the K-wire guide tube insert's guide tube and into the patient's glenoid. The guide base component, radial offset insert, and K-wire guide tube are then removed, leaving the K-wire implanted at the targeted position and angular orientation with respect to the patient's glenoid. The glenoid may be further prepared for implantation of a surgical implant by drilling an opening along the axis of the K-wire. The opening is sized in diameter and depth to accommodate the peg, post, or pin located on the superior side of a shoulder implant baseplate.

In some embodiments, a method of preparing an instrumentation guide includes receiving parameters associated with a guide base component 205 (e.g., size, such as small, medium, large, extra large, etc.), radial offset insert 210 (e.g., offset value), and K-wire guide tube insert 215 (e.g., angle of tube to plate) and orientation values (e.g., angular orientation of radial offset insert 210 with respect to guide base component 205 and angular orientation of K-wire guide tube insert 215 with respect to guide base component 205, etc.). The method also includes assembling and orienting the guide base component 205, radial offset insert 210, and K-wire guide tube insert 215 with respect to each other, as discussed above.

OTHER CONSIDERATIONS

In some embodiments, systems and components as described herein can take the form of a computing system that is in communication with one or more computing systems and/or one or more data sources via one or more networks. The computing system may be used to implement one or more of the systems and methods described herein. While various embodiments illustrating computing systems and components are described herein, it is recognized that the functionality provided for in the components and modules (which may also be referred to herein as engines) of computing system may be combined into fewer components and modules or further separated into additional components and modules. Modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Any modules can be executed by one or more CPUs.

A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein can be implemented as software modules but may be also represented in hardware or firmware. Generally, the modules described herein refer to logical modules that may be combined with other modules or divided into sub-modules despite their physical organization or storage. In addition, all the methods described herein may be executed as instructions on a CPU and may result in the manipulation or transformation of data.

In some embodiments, hardware components of the system include a CPU, which may include one, two, or more conventional microprocessors. The system further includes a memory, such as random-access memory ("RAM") for temporary storage of information and a read only memory ("ROM") for permanent storage of information, and a mass storage device, such as a hard drive, flash drive, diskette, or optical media storage device. Typically, the modules of the system are connected using a standard based bus system. In different embodiments, the standard based bus system could be Peripheral Component Interconnect ("PCI"), Microchannel, Small Computer System Interface ("SCSI"), Industrial Standard Architecture ("ISA") and Extended ISA ("EISA") architectures, for example.

In some embodiments, systems and components thereof can be operatively coupled to a destination modality that can be an email or other messaging modality; SAMBA, Windows, or other file sharing modality; FTP or SFTP server modality; a VPN; a printer; and the like. In accordance with some embodiments, systems may be software or hardware-software systems. For example, systems can include a communication engine configured to receive and transmit information.

In accordance with some embodiments, communication engine may be any software or hardware software-system configured to receive and/or transmit data. Communication engine may be configured to transmit and receive data over a variety of network interfaces including wired and wireless networks or a combination thereof, such as via Ethernet, 802.11x, Bluetooth, FireWire, GSM, CDMA, LTE, and the like. Communication engine may also be configured to transmit and/or receive data with file transfer protocols such as TCP/IP, as well as various encryption protocols, such as, for example, WEP, WPA, WPA2, and/or the like.

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The ranges disclosed herein also encompass any and all overlap, sub-ranges, and combinations thereof. Language such as "up to," "at least," "greater than," "less than," "between," and the like includes the number recited. Numbers preceded by a term such as "approximately," "about," and "substantially" as used herein include the recited numbers (e.g., about 10%=10%), and also represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of the stated amount.

What is claimed is:

1. A method, comprising:
providing an alignment compass base, wherein the alignment compass base is configured to enable rotational orientation of a radial offset insert and a K-wire guide tube with respect to a guide base;
inserting the guide base component into the alignment compass base;
inserting the radial offset insert into the guide base component;
rotating, using a first alignment tool, the radial offset insert to a first orientation angle with respect to the guide base component;
inserting the K-wire guide tube into the radial offset insert;
rotating, using a second alignment tool, the K-wire guide tube to a second orientation angle with respect to the guide base component.

2. The method of claim 1,
wherein the guide base component includes an opening configured to receive a key; and
wherein inserting the radial offset insert into the guide base component comprises expanding the opening by rotating the key.

3. The method of claim 2, wherein rotating the radial offset insert to the first orientation angle further comprises contracting the opening by rotating the key in the opening.

4. The method of claim 1,
wherein the radial offset insert includes an opening configured to receive a key; and
wherein inserting the K-wire guide tube into the radial offset insert comprises expanding the opening by rotating the key in the opening.

5. The method of claim 4, wherein rotating the radial offset insert to the first orientation angle further comprises contracting the opening by rotating the key in the opening.

6. The method of claim 1, wherein the first alignment tool is a disc or a plate.

7. The method of claim 1, wherein the first alignment tool includes an opening shaped to receive a perimeter of a portion of the radial offset insert and wherein the first alignment tool is configured to contact with a side of the radial offset insert when rotated.

8. The method of claim 1, wherein the second alignment tool is a disc or a plate.

9. The method of claim 8, wherein the second alignment tool includes an opening shaped to receive a perimeter portion of the K-wire guide tube and wherein the second alignment tool is configured to contact with a side of the radial offset insert when rotated.

10. The method of claim 1, further comprising rotating the first alignment tool and the second alignment tool with respect to the alignment compass base.

11. A customizable shoulder replacement instrumentation device, comprising:
an alignment compass base, wherein the alignment compass base is configured to enable rotational orientation of a radial offset insert and a K-wire guide tube with respect to a guide base component;
the guide base component configured to be inserted into the alignment compass base;
the radial offset insert configured to be inserted into the guide base component, wherein the radial offset insert may be rotated to a first orientation angle with respect to the guide base component using a first alignment tool; and
the K-wire guide tube configured to be inserted into the radial offset insert, wherein the K-wire guide tube may be rotated to a second orientation angle with respect to the guide base component using a second alignment tool.

12. The customizable shoulder replacement instrumentation device of claim 11, wherein the guide base component includes an opening configured to receive a key; and
wherein the radial offset insert may fit into the guide base component by expanding the opening by rotating the key.

13. The customizable shoulder replacement instrumentation device of claim 12, wherein the radial offset insert may fit into the guide base component by contracting the opening by rotating the key in the opening.

14. The customizable shoulder replacement instrumentation device of claim 11, wherein the radial offset insert includes an opening configured to receive a key; and wherein inserting the K-wire guide tube into the radial offset insert comprises expanding the opening by rotating the key in the opening.

15. The customizable shoulder replacement instrumentation device of claim 14, wherein rotating the radial offset insert to the first orientation angle further comprises contracting the opening by rotating the key in the opening.

16. The customizable shoulder replacement instrumentation device of claim 11, wherein the first alignment tool is a disc or a plate.

17. The customizable shoulder replacement instrumentation device of claim 16, wherein the first alignment tool includes an opening shaped to receive a perimeter of a portion of the radial offset insert and wherein the first alignment tool is configured to contact with a side of the radial offset insert when rotated.

18. The customizable shoulder replacement instrumentation device of claim 11, wherein the second alignment tool is a disc or a plate.

19. The customizable shoulder replacement instrumentation device of claim 18, wherein the second alignment tool includes an opening shaped to receive a perimeter portion of the K-wire guide tube and wherein the second alignment tool is configured to contact with a side of the radial offset insert when rotated.

20. The customizable shoulder replacement instrumentation device of claim 11, wherein the first alignment tool and the second alignment tool are rotated with respect to the alignment compass base.

21. A customizable shoulder replacement instrumentation kit, comprising:
an alignment compass base, wherein the alignment compass base is configured to enable rotational orientation of a radial offset insert and a K-wire guide tube with respect to a guide base component;
the guide base component of a plurality of guide base components configured to be inserted into the alignment compass base, wherein the plurality of guide base components comprises guide base components of different sizes;
the radial offset insert of a plurality of radial offset inserts configured to fit into the guide base component,
wherein the plurality of radial offset inserts comprises radial offset inserts of different sizes;
wherein the radial offset insert may be rotated to a first orientation angle with respect to the guide base component using a first alignment tool;
the K-wire guide tube of a plurality of K-wire guide tubes configured to fit into the radial offset insert,
wherein the plurality of K-wire guide tubes comprises K-wire guide tubes of different sizes; and
wherein the plurality of K-wire guide tubes may be rotated to a second orientation angle with respect to the guide base component using a second alignment tool.

22. The customizable shoulder replacement instrumentation kit of claim 21, wherein the guide base component includes an opening configured to receive a key; and
wherein inserting the radial offset insert into the guide base component comprises expanding the opening by rotating the key.

23. The customizable shoulder replacement instrumentation kit of claim 22, wherein the radial offset insert may be inserted into the guide base component by contracting the opening by rotating the key in the opening.

24. The customizable shoulder replacement instrumentation kit of claim 21,
wherein the radial offset insert includes an opening configured to receive a key; and
wherein inserting the K-wire guide tube into the radial offset insert comprises expanding the opening by rotating the key in the opening.

25. The customizable shoulder replacement instrumentation kit of claim 24, wherein rotating the radial offset insert to the first orientation angle further comprises contracting the opening by rotating the key in the opening.

26. The customizable shoulder replacement instrumentation kit of claim 21, wherein the first alignment tool is a disc or a plate.

27. The customizable shoulder replacement instrumentation kit of claim 26, wherein the first alignment tool includes an opening shaped to receive a perimeter of a portion of the radial offset insert and wherein the first alignment tool is configured to contact with a side of the radial offset insert when rotated.

28. The customizable shoulder replacement instrumentation kit of claim 21, wherein the second alignment tool is a disc or a plate.

29. The customizable shoulder replacement instrumentation kit of claim 28, wherein the second alignment tool includes an opening shaped to receive a perimeter portion of the K-wire guide tube and wherein the second alignment tool is configured to contact with a side of the radial offset insert when rotated.

30. The customizable shoulder replacement instrumentation kit of claim 21, wherein the first and second alignment tools are rotated with respect to the alignment compass base.

* * * * *